(12) United States Patent
Shutic

(10) Patent No.: US 10,913,085 B2
(45) Date of Patent: Feb. 9, 2021

(54) POWDER COATING SYSTEMS WITH AIR OR LIQUID COOLED CYCLONE SEPARATORS

(71) Applicant: NORDSON CORPORATION, Westlake, OH (US)

(72) Inventor: Jeffrey R. Shutic, Wakeman, OH (US)

(73) Assignee: Nordson Corporation, Westlake, OH (US)

(*) Notice: Subject to any disclaimer, the term of this patent is extended or adjusted under 35 U.S.C. 154(b) by 261 days.

(21) Appl. No.: 15/521,283

(22) PCT Filed: Nov. 11, 2015

(86) PCT No.: PCT/US2015/060163
§ 371 (c)(1),
(2) Date: Apr. 22, 2017

(87) PCT Pub. No.: WO2016/077463
PCT Pub. Date: May 19, 2016

(65) Prior Publication Data
US 2018/0353987 A1 Dec. 13, 2018

Related U.S. Application Data

(60) Provisional application No. 62/078,466, filed on Nov. 12, 2014.

(51) Int. Cl.
*B05B 14/45* (2018.01)
*B05B 14/48* (2018.01)
(Continued)

(52) U.S. Cl.
CPC .............. *B05B 14/45* (2018.02); *B05B 14/48* (2018.02); *B05B 16/00* (2018.02); *B05C 19/06* (2013.01)

(58) Field of Classification Search
USPC ............. 118/308, 309, 69; 427/240; 55/337, 55/DIG. 46; 454/50
See application file for complete search history.

(56) References Cited

U.S. PATENT DOCUMENTS 3,470,678 A * 10/1969 Schumacher ............. B04C 5/20
55/434.1
4,590,884 A * 5/1986 Kreeger .................. B05B 14/43
118/308
(Continued)

FOREIGN PATENT DOCUMENTS

CN 202 316 148 U 7/2012
DE 198 35 333 A1 2/2000
(Continued)

*Primary Examiner* — Yewebdar T Tadesse
(74) *Attorney, Agent, or Firm* — Baker & Hostetler LLP

(57) ABSTRACT

A cyclone is disclosed that includes an enclosure that encloses at least a portion of the cyclone. The enclosure delimits an enclosed volume between an interior surface of the enclosure and the exterior surface of the body. The enclosure retains a gas coolant or liquid coolant in thermal exchange with the enclosed exterior surface of the cyclone. A powder coating system is disclosed that includes a spray booth and a cyclone, where ambient air is added to process air that is drawn from the spray booth into the cyclone. The ambient air may be added to the process air to cool the process air to a temperature that is lower than the process air would be if ambient air were not added, and also may be used to dilute the powder overspray entrained process air.

23 Claims, 18 Drawing Sheets

(51) Int. Cl.
    *B05C 19/06*    (2006.01)
    *B05B 16/00*    (2018.01)

(56) References Cited

U.S. PATENT DOCUMENTS

| | | | | |
|---|---|---|---|---|
| 4,615,715 | A * | 10/1986 | Seshamani | B04C 5/085 |
| | | | | 55/434.4 |
| 5,107,756 | A * | 4/1992 | Diaz | B05B 14/48 |
| | | | | 454/53 |
| 5,645,620 | A * | 7/1997 | Shenker | B01D 50/002 |
| | | | | 55/315.1 |
| 6,458,209 | B1 | 10/2002 | Shutic | |
| 7,325,750 | B2 | 2/2008 | Shutic et al. | |
| 8,033,241 | B2 | 10/2011 | Fulkerson et al. | |
| 2006/0091071 | A1 * | 5/2006 | Tashiro | B04C 5/12 |
| | | | | 210/512.1 |
| 2007/0128342 | A1 | 6/2007 | Stenzel | |
| 2014/0216333 | A1 * | 8/2014 | Hoversten | B04C 3/06 |
| | | | | 118/308 |

FOREIGN PATENT DOCUMENTS

| | | |
|---|---|---|
| DE | 10 2012 106842 A1 | 5/2013 |
| EP | 0 094 098 A1 | 11/1983 |
| GB | 2 172 222 A | 9/1986 |
| WO | 91/01207 A1 | 2/1991 |
| WO | 00/18483 A1 | 4/2000 |

\* cited by examiner

POWDER COATING SYSTEMS WITH AIR OR LIQUID COOLED CYCLONE SEPARATORS

CROSS-REFERENCE TO RELATED APPLICATIONS

This application is a U.S. National Stage of International Patent App. No. PCT/US2015/060163, filed Nov. 11, 2015, and published as International Patent Pub. No. WO 2016/077463 on May 19, 2016, which claims priority to U.S. Provisional App. No. 62/078,466, filed Nov. 12, 2014, the disclosures of which are incorporated by reference in their entirety.

TECHNICAL FIELD OF THE DISCLOSURE

This disclosure relates to powder coating systems and processes that use cyclone separators. More particularly, this disclosure relates to powder coating systems and processes that introduce controls for managing a temperature of process air introduced from the spray booth into and within a cyclone separator, and separately a cyclone separator with cooling.

BACKGROUND OF THE DISCLOSURE

Powder coating materials are typically applied to objects or workpieces by spray application apparatuses and processes. These spray application apparatuses and processes include electrostatic and non-electrostatic processes. Spray application of powder coating material from a feed center or supply to workpieces often is done in a spray booth that is used to contain and recover powder overspray that does not adhere to the workpieces during a powder coating operation. Powder overspray may be recovered from the spray booth and either recycled back to the feed center for re-use or otherwise disposed or used in other applications. A powder cyclone separator is commonly used as part of a powder recovery system whereby powder overspray entrained air is drawn from the spray booth through duct work into a cyclone separator which operates to remove powder that is entrained in the air stream. The separated powder falls to the bottom of the powder cyclone separator where it is then transferred to a receptacle.

Due to high temperatures of a piece being coated or within the spray booth, the powder may melt and become sticky. In conventional powder coating systems, the sticky overspray powder may adhere to various surfaces of the powder recovery system and/or become caught in the after-filter system, leading to a constant need to clean the powder recovery system and/or premature failure of the after-filter system. As such, there is a need to cool the process air as it travels through the powder recovery system.

SUMMARY OF THE DISCLOSURE

A cyclone that lowers the temperature of at least a portion of an interior surface of the cyclone is disclosed. In an embodiment, a cyclone includes a body configured to receive process air, where the body includes an exterior surface and an interior surface, and an enclosure that encloses at least a portion of an exterior surface of the body. The enclosure delimits an enclosed volume between an interior surface of the enclosure and the exterior surface of the body. The enclosure is also configured to retain a cooling medium in thermal exchange with the exterior surface of the body enclosure. The enclosure can be fluid-tight to retain a fluid that is in thermal exchange with the enclosed exterior surface, when the cooling medium comprises a liquid. The cooling medium can also be a gas. Additional embodiments are presented herein.

In some embodiments, the cyclone can include a pump configured to move the liquid through the enclosed volume from a fluid inlet of the enclosure to a fluid outlet of the enclosure. The body can include a first portion and a second portion, where the first portion and the second portion can be configured to align with each other along a first axis, and where the second portion can be pivotally attached to said first portion by a joint. The second portion can be configured to pivot about the joint between a first position and a second position, and the second portion can be configured to align with the first portion along the first axis when the second portion is in the first position. The second portion can include a powder outlet end that is releasably connectable to a powder receptacle. The powder receptacle can be moveable away from the cyclone when the second portion is released from the powder receptacle. A cooling unit can be configured to reduce a temperature of the cooling medium.

A powder coating system with air being admitted or added to a process air flow between a spray booth and a cyclone is also disclosed. In an embodiment, the powder coating system includes a spray booth including a recovery duct for powder overspray, where the recovery duct has a recovery duct inlet and a recovery duct outlet. The powder coating system also includes a cyclone comprising a powder inlet, and a suction duct that connects the recovery duct outlet with the cyclone powder inlet, where the recovery duct and the suction duct delimit a powder overspray flow path from the spray booth to the cyclone. The powder coating system also includes an opening for admitting air from an exterior of the powder coating system into the powder overspray flow path.

The recovery of admitted air may optionally be ambient air that is admitted into a powder flow path and added to process air flow before the process air flow enters the cyclone. In another embodiment, a powder coating system that utilizes adding air to process air flow before the process air flow enters the cyclone.

In some embodiments, the opening can be provided in the recovery duct. The powder coating system can further include a moveable cover configured to adjust a size of the opening. The ambient air may combine with process air that travels from said spray booth to the cyclone via the powder overspray flow path.

The powder coating system can further include an enclosure that encloses a portion of an exterior surface of the cyclone, where the enclosure delimits an enclosed volume between an interior surface of the enclosure and the exterior surface of the body. The enclosure can be configured to retain a cooling medium in thermal exchange the said enclosed exterior surface. The cyclone can include a first portion and a second portion, where the first portion and the second portion may be configured to align with each other along a first axis, and where the second portion may be pivotally attached to said first portion by a joint. The second portion may be configured to pivot about the joint between a first position and a second position, where the second portion may be configured to align with the first portion along the first axis when the second portion is in the first position. The second portion may include a powder outlet end that is releasably connectable to a powder receptacle. The powder receptacle may be moveable away from said cyclone when the second portion is released from the powder receptacle.

In accordance with another embodiment, a method is provided for reducing temperature and/or diluting a powder entrained air flow from a spray booth to a cyclone. In an embodiment, the method includes reducing the temperature of an interior surface of the cyclone compared to what the temperature of the interior surface would be in the absence of thermal exchange with the fluid. For example, process air may be admitted into the cyclone through an inlet opening of the cyclone. An inlet temperature of the admitted process air may be measured at a location proximate to the inlet opening a required amount of cooling energy may be determined based on the inlet temperature.

These and other aspects and advantages of the inventions, embodiments and the disclosure herein will be readily understood and appreciated from the following detailed description hereinafter and the accompanying drawings.

DETAILED DESCRIPTION OF THE EXEMPLARY EMBODIMENTS

Although the various embodiments herein illustrate a particular form and structure of a powder recovery cyclone separator, also referred to herein as a cyclone, the various inventions may be used alone, in various combinations and/or collectively with different cyclone designs. The basic structural features of a cyclone that the present disclosure utilizes is a first or upper portion that typically is cylindrical and a second or lower portion that typically is conical. A cyclone may have many other optional structural features which form no required structure in order to practice the inventions herein. Conventionally, the upper portion includes an intake section that receives a flow of powder entrained air at a tangential inlet to the intake section, and a powder recovery section through which cyclonically separated powder falls to an outlet. All other exemplary embodiments herein of various components of a cyclone or a powder coating system, such as but not limited to the spray booth, feed center, spray guns and so on are optional design features that may be selected for a particular spray coating operation or processes. In other words, the cyclone concepts disclosed herein may be used with a wide variety of cyclone and system features including a feed center for supplying powder coating material, spray guns, electronic control systems for the spray booth, spray guns, gun control systems, gun movers, reciprocators, oscillators, overhead conveyor systems, and so on. The inventions also are not limited to any particular spray technology, and may include but not limited to electrostatic, tribo-electric, non-electrostatic, hybrid technologies, as well as automatic and manual application systems, as well as being used with dense phase and/or dilute phase powder conveyance technologies.

Introduction

Figure 12:
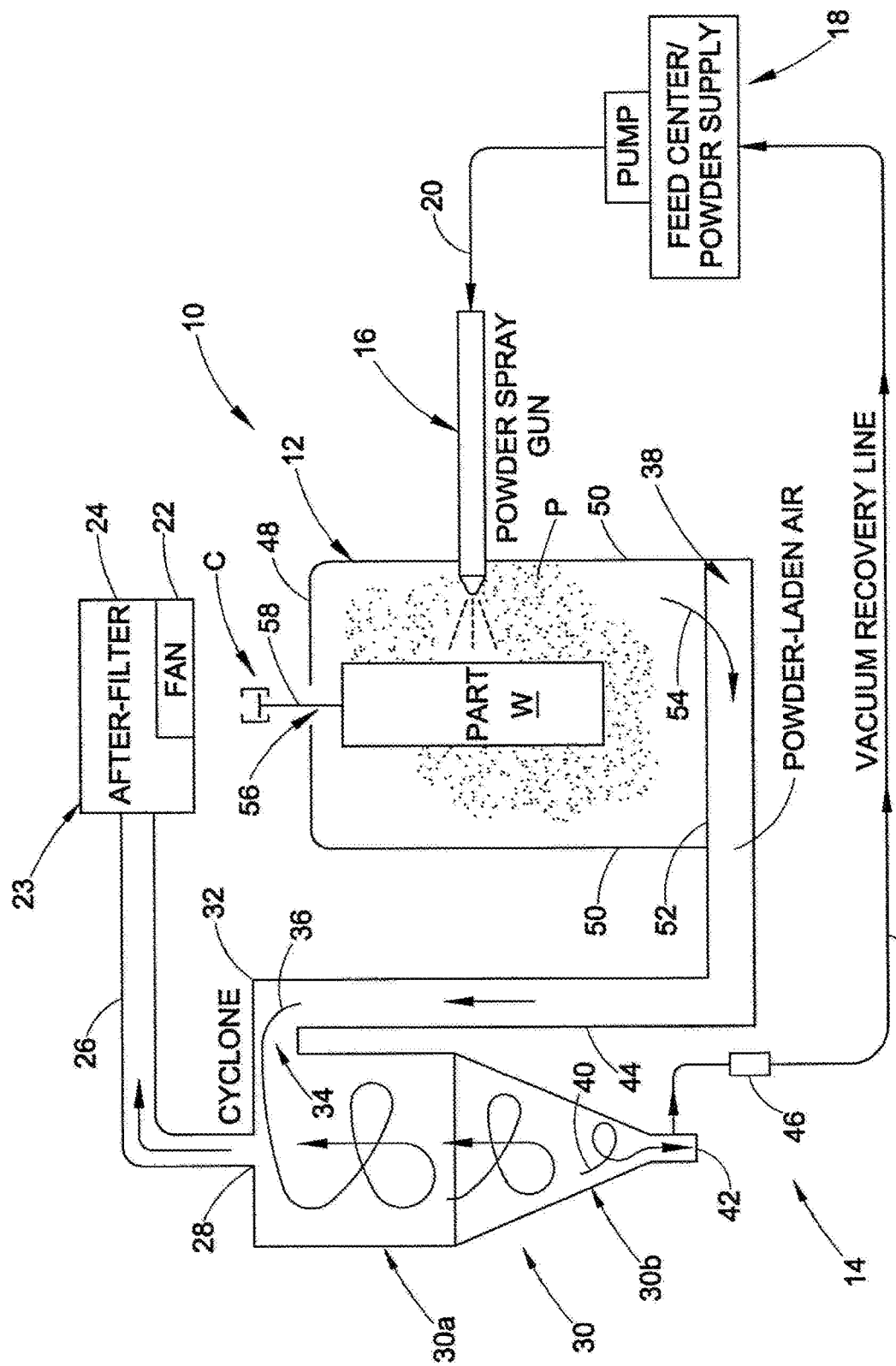
FIG. 12 illustrates a prior art powder coating system such as may be used with the present embodiments presented in this disclosure.

FIG. 12 illustrates a prior art powder coating system 10 that includes a spray booth 12 and a powder overspray recovery system 14. The spray booth 12 in this embodiment may be supported on a structural frame (not shown) above the shop floor. While a prior art powder coating system to provide context for understanding the present inventions is described herein, the present inventions may be used with many different powder coating systems, either those known or that may be later developed.

In the prior art design of FIG. 12, a generic or typical spray booth that may be traditional in design includes an overhead conveyor to transport parts through the spray booth for a coating operation. While the spray booth depicted in FIG. 12 includes an overhead conveyor, one of ordinary skill in the art would appreciate that the exemplary embodiments disclosed herein may be used for coating operations of pipe and other tubular workpieces, in particular long sections of pipe, as well as large diameter pipe that may not hang from a conveyor. In particular, the dimensions of the pipe may prevent it from being hung from a conveyor. Moreover, one of ordinary skill in the art would appreciate that the embodiments disclosed herein are not limited to any particular spray booth design.

A powder recovery system 14 commonly is used to recover powder overspray that is generated by a plurality of powder coating material application devices 16 such as, for example, a spray gun, are used to coat workpieces W with powder coating material P as the workpieces W advance through the spray booth 12 interior. These application devices 16 may include automatic and manual spray guns, for example. Automatic spray guns often are mounted on a gun mover system (not shown) which may include a reciprocator or oscillator. The gun mover system may be used to both extend and retract the spray guns with respect to the spray booth 12 and also may be used to produce an up/down oscillatory motion of the guns during a coating operation. The spray guns 16 may be selected from any number of spray gun designs, including but not limited to an ENCORE® spray gun available from Nordson Corporation, Westlake, Ohio. The spray guns 16 may be electrostatic, non-electrostatic, tribo-charging or other designs and spraying technology may be used. A series of vertical gun slots or openings in the spray booth walls may be provided for automatic spray guns, and the spray booth 12 may also include other openings through which an operator can manually spray workpieces.

A feed center 18 may be provided that contains a supply of powder coating material P that will be applied the workpieces within the spray booth 12. The feed center 18 for example may include any number of hoppers, boxes or other containers of powder, along with suitable pumps and hoses to feed material to the one or more spray guns 16. A powder hose 20 connects a powder input of the spray gun 16 to an output of a powder pump (not shown) which may be located in the feed center 18 or other convenient location. Not all powder coating systems utilize a feed center and in other embodiments, powder coating material may be supplied to the spray gun 16 simply using a pump that draws powder from a box or hopper or other container. An example of a feed center 18 is described in U.S. Pat. No. 7,325,750 for POWDER COATING SYSTEM WITH IMPROVED OVERSPRAY COLLECTION, issued Feb. 5, 2008, and also U.S. Pat. No. 8,033,241 for SUPPLY FOR DRY PARTICULATE MATERIAL, issued Oct. 11, 2011; the entire disclosures of which are fully incorporated herein by reference. However, many different feed centers or other suppliers for powder coating material may be used as needed. The feed center described in U.S. Pat. No. 7,325,750 may, for example, be used with Venturi type pumps for dilute phase systems and the feed center described in U.S. Pat. No. 8,033,241 may be used, for example, with dense phase pumps for dense phase systems. But the present inventions may be used with dense phase or dilute phase pumps and powder spray systems.

A suitable operator interface to a control system (not shown) may be provided to control operation of the spray guns 16, the powder recovery system 14, the spray booth 12 including an optional overhead conveyor C, the gun mover system, gun controls, feed center and pump controls and so on, as is well known to those skilled in the art and need not be described herein to understand and practice the present inventions. The control system and the operator interface may be selected from any number of well known control system concepts as are well known to those skilled in the art, or specifically designed for a particular system.

In the example of FIG. 12, the powder overspray recovery system 14 is realized in the form of a powder cyclone separator 30. Depending on how much powder overspray needs to be extracted from the spray booth, or the geometric constraints of the system, a single cyclone, twin cyclone or more cyclones alternatively may be used. The exemplary embodiments herein illustrate a twin cyclone configuration, but the inventions and concepts herein may optionally be used with a single cyclone configuration.

A blower and after filter system 23 may include an after filter system 24 and a suction fan 22 that are in fluid communication through a duct 26 with an exhaust outlet 28 of the cyclone 30, and provide the energy and air flow required to generate a vortex 36 within the cyclone 30 for operation of the cyclone powder recovery system 14. The fan 22 produces suction that draws a large air flow into the cyclone 30, in the form of a substantial powder entrained air flow pulled from the spray booth 12 interior, to an intake duct 32 of the cyclone. The cyclone 30 commonly includes a tangential powder inlet 34 (relative to a vertical axis of the cyclone) to cause the familiar cyclonic circulation or vortex 36 that causes separation of powder coating material from the air.

The air flow produced by operation of the powder recovery system 14 also produces a substantial flow of air into and through the spray booth 12, sometimes referred to as containment air. The containment air flow prevents the loss of powder overspray outside the spray booth 12. Powder overspray that does not adhere to the workpiece W during a powder coating operation falls by gravity and also may be assisted to flow by the containment air into a recovery duct 38. The powder entrained air is thus drawn into the cyclone 30 during operation of the after-filter fan 22.

Typically, the after filter system 24 and the fan 22 draw a substantial flow of powder entrained air into the cyclone 30 and the separated powder descends as indicated by the arrows 40 to a cyclone outlet 42. From the cyclone outlet 42 the recovered powder may be returned to the feed center 18 or otherwise dumped to waste or reclaimed in some other manner. The powder entrained air that is pulled into the cyclone tangential inlet 34 via the intake duct 32 may be drawn through a vertical extraction duct 44.

Powder overspray that has been separated by the cyclone 30 may be recovered from the cyclone outlet 42 and returned to the feed center 18, as is commonly done if the powder will be reused, or alternatively may be conveyed to another container or receptacle or dumped to waste. A transfer pump 46 may be used to pull the recovered powder from the outlet 42 of the cyclone 30 to transfer the powder back to the feed center 18 through a transfer powder hose 60 or otherwise disposed. The cyclone 30 may include an optional transfer pan (not shown in FIG. 12) that provides an interface between the transfer pump 46 and the cyclone outlet 42 for collection of the powder that falls from the cyclone 30 interior. A transfer pan is commonly used in twin cyclone configurations as well.

The spray booth 12 may be generally rectangular in shape although other shapes and configurations may conveniently be used. A spray booth 12 will typically have a longitudinal horizontal axis X into the plane of the drawing for FIG. 12, which is typically the axis along which the conveyor C moves the workpieces W through the spray booth 12. The spray booth 12 may have a ceiling 48 supported by one or more vertical sides or walls 50, and a floor 52. As represented by the arrow 54, powder overspray tends to fall to the floor 52 or otherwise become entrained in the containment air such that powder entrained air passes through openings, duct work or other openings in or around the floor 52 to an exhaust opening that is in fluid communication with the recovery duct 38. The ceiling 48 may include an overhead conveyor slot 56 that allows hangers 58 to extend from the conveyor C to suspend workpieces inside the spray booth 12 interior.

All of the panels for the spray booth structure, including by not limited to the floor 52, ceiling 48, walls 50 and so on may each be made of composite materials including a foam core panel and gelcoat inner surface such as sold by Nordson Corporation in powder coating booths as an Apogee® panel structure. Other materials may alternatively be used as required, for example, PVC walls and panels. The Apogee® panel construction is also described in U.S. Pat. No. 6,458, 209 for POWDER COATING BOOTH CONTAINMENT STRUCTURE issued to Shutic, Oct. 1, 2002, the entire disclosure of which is fully incorporated herein by reference.

However, alternative spray booths such as, for example, in the exemplary embodiments herein, may have walls, ceiling and floor made of metal such as stainless steel sheet metal. For example, in fusion bond epoxy ("FBE") pipe coating operations where a pipe may be heated up to 450° F. prior to being introduced into the spray booth structure, the surface temperature of the pipe being coated may elevate the interior surfaces of the spray booth enclosure beyond 140° F. This may especially be the case when the pipe being coated has a large diameter or is of heavy wall steel construction. The surfaces of the pipes entering the spray booth may also be in close proximity to the structure surrounding the entrance to the spray booth so as to minimize a loss of surface temperature of the pipe prior to the coating operation. In such operations, a plastic or composite spray booth enclosure may not be practical due to its inability to withstand such high temperatures. When gas-fired furnaces are employed, infrared saturation of the entry side of the booth enclosure may be common. As such, induction coils are typically used to heat the pipe. In such instances, the spray booth enclosure may need to be constructed from a non-ferrous material such as stainless steel to prevent heating of the booth walls due to electromagnetic energy take-up.

DETAILED DESCRIPTION

As used herein, the term "process air" refers to the powder entrained air flow that is drawn through the spray booth 12 in order to recover powder overspray. Process air therefore is comparable to what is referred to in the art as containment air which is drawn by the after-filter system 23 through a cyclone from the spray booth. The term "admitted air" means an air flow that is added to the process air flow for purposes described below. Admitted air may be the optionally unconditioned ambient air of the environment that surrounds the powder coating system. But admitted air may alternatively, if needed, be ambient air that has been conditioned, for example as to temperature, relative humidity and so on, prior to being added to the process air flow. Therefore, process air is an air flow rate and volume that is produced by operation of the after-filter system 23 through the cyclone and the spray booth absent the introduction of admitted air through a provided opening as described below. The term "powder flow path" as used herein refers to duct work or other pathways that contain powder overspray entrained air that flows from the spray booth into the cyclone.

FIGS. 1-4 illustrate different views of an embodiment of a powder coating system 70. The powder coating system 70 includes a spray booth 72 and a powder overspray recovery system 74. The spray booth 72 may be a multi-walled construction made of stainless steel sheet metal and has a front opening 76 that receives one or more spray guns (not shown in FIGS. 1 and 2, but see FIG. 12 for an example) by which powder coating material is applied to a workpiece W. The powder coating system 70 may include the additional system components as described with reference to FIG. 12 as needed. The spray booth 72 may include lateral openings 78 through vertical walls 80 which a workpiece W, for example a pipe as shown, may pass through the spray booth 72 during a powder coating operation. The various drawings omit structure that supports the workpiece W, passes the workpiece W through the spray booth 72, and optionally but typically also rotates the workpiece W about the longitudinal axis X thereof. The powder coating material may be applied by the spray guns generally on an alignment that is transverse the axis X.

The workpieces W need not be pipe, but as an example, the spray booth 72 may be designed to accommodate very large pipe, for example, fifty-six inch pipe or larger in diameter. Smaller pipe diameters may also be used. The workpieces W typically are also heated so as to help the coating material adhere to the workpiece as it passes out of the spray booth and on for further processing. As an example, the workpiece W may be heated to approximately 450° F. or higher, although lower temperatures may also be used as needed for different workpiece materials and powder coating material. Due to the high heat of the workpiece, the process air may be on the order of approximately 140° F. inside the spray booth 72. This temperature or other process air temperatures can be near the glass transition temperature of the powder coating material.

Powder overspray becomes entrained in the containment air that is drawn from the spray booth 72 by the after-filter system (not shown in FIGS. 1 and 2 but see FIG. 12 for an example) and this powder entrained air as noted above is referred to herein as the process air.

The powder recovery system 74 may be used to recover this large quantity of high temperature powder overspray. The powder recovery system 74 includes a cyclone 82 (which is partially in view in FIGS. 1 and 2). A process air extraction or suction duct 84 provides a powder flow path from a process air outlet 86 of the spray booth 72 to a powder inlet 88 of the cyclone 82. A twin or double cyclone 82 is illustrated but alternatively a single cyclone or more than two cyclones may be used as needed. An enclosure 90 encloses at least a portion of the cyclone 82. In the case of a single cyclone, it may well be that the enclosure 90 could surround most or all of the cyclone, but because of the position of the powder inlet 88 to the cyclone 82 it can be difficult in some cyclone designs to have the enclosure 90 enclose the entire cyclone 82 structure. An exhaust outlet 92, which may include an exhaust duct, is connectable to an after-filter system 23 and fan 22 (see FIG. 12). The after-filter system 23 is omitted in FIGS. 1 and 2 for clarity. The exhaust outlet 92 of the cyclone 82 receives the exhaust air from the cyclone 82 in which the exhaust air is the process air with most of the entrained powder removed by the vortex and cyclonic action, but some powder typically remains entrained in the exhaust air flow. This exhaust air is then filtered by the after-filter system. The cyclone 82, particularly a stationary upper portion 100, may be supported on the shop floor or other foundation with a frame 94 that typically is fixed in position for stability. However, as further described below, a lower portion 102 of the cyclone 82 may be moveable for cleaning and color change operations.

Figure 1:
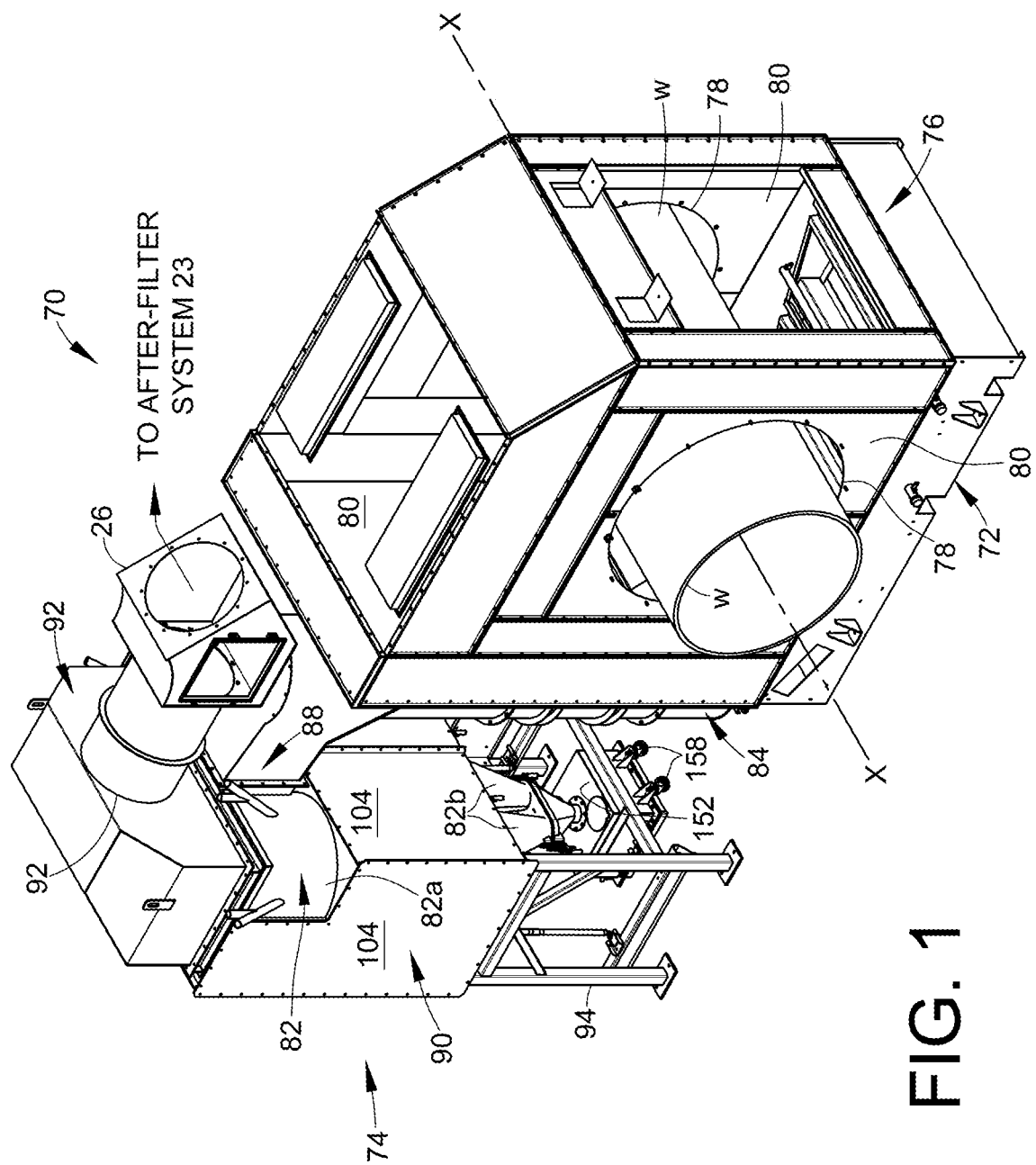
FIG. 1 is a front perspective view of an embodiment of a powder coating system in accordance with the present disclosure.
Figure 2:
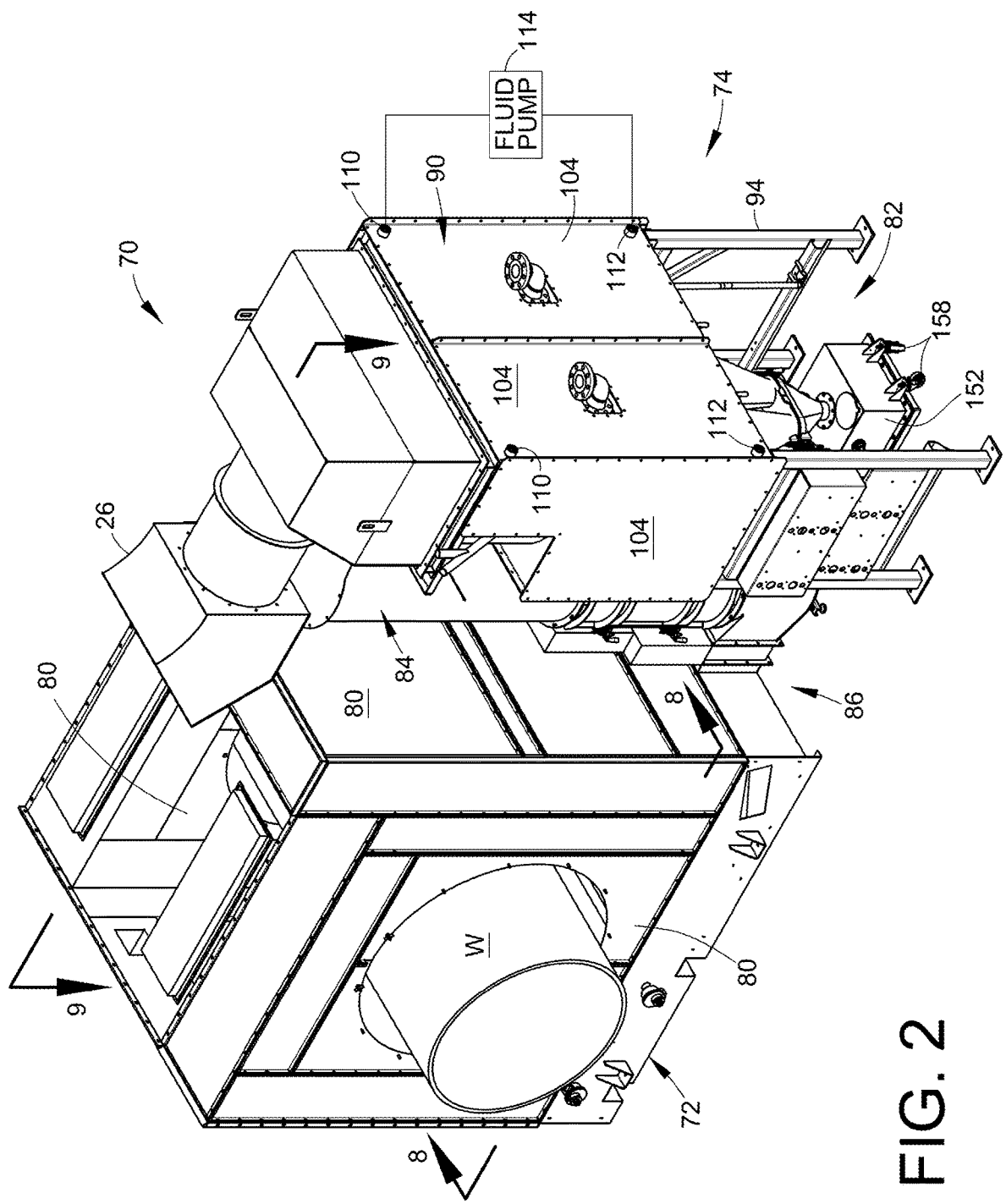
FIG. 2 is a rear perspective view of the embodiment of FIG. 1.
Figure 3:
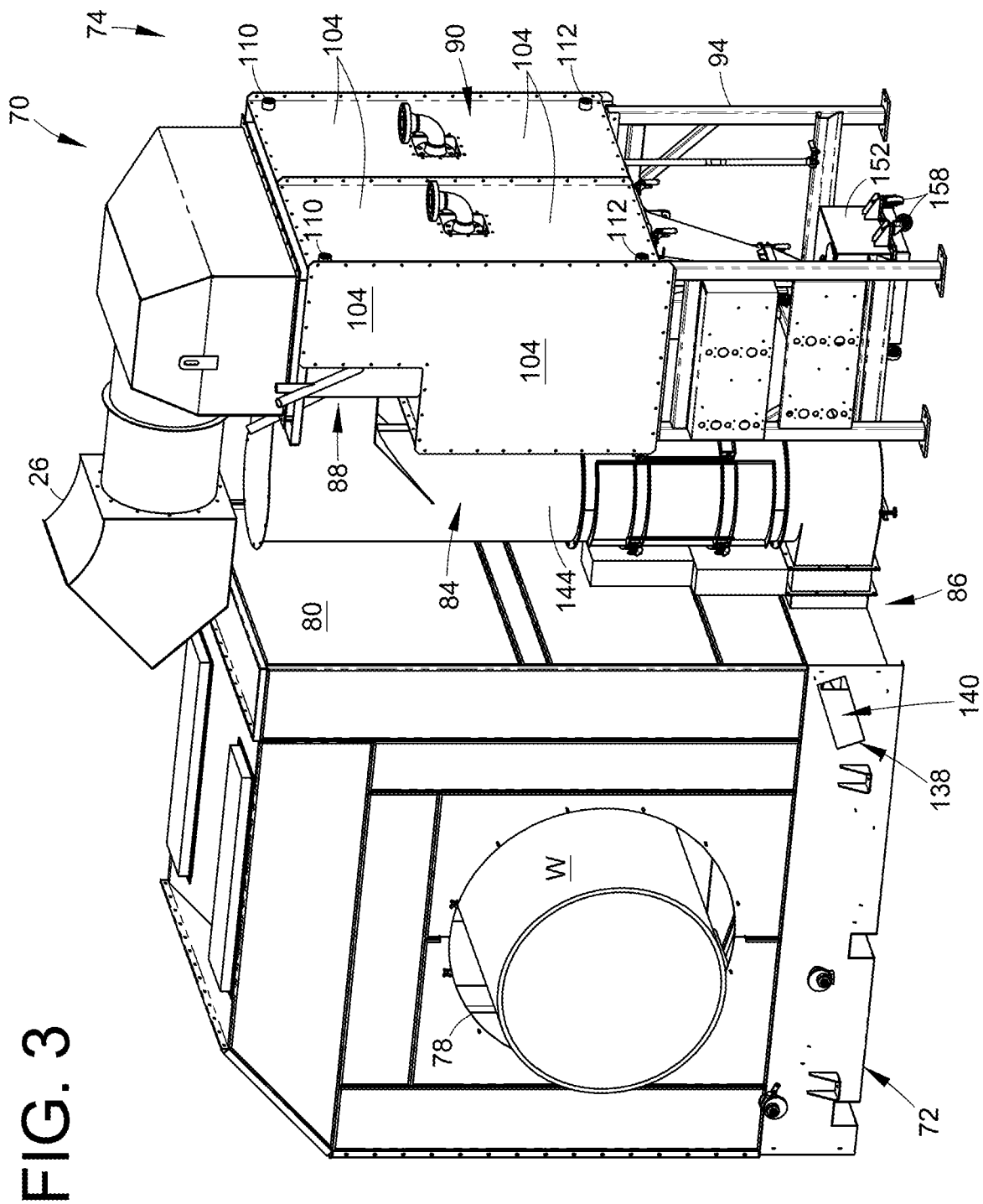
FIG. 3 is an elevated side perspective view of the embodiment of FIG. 1 from the side shown in FIG. 2.
Figure 4:
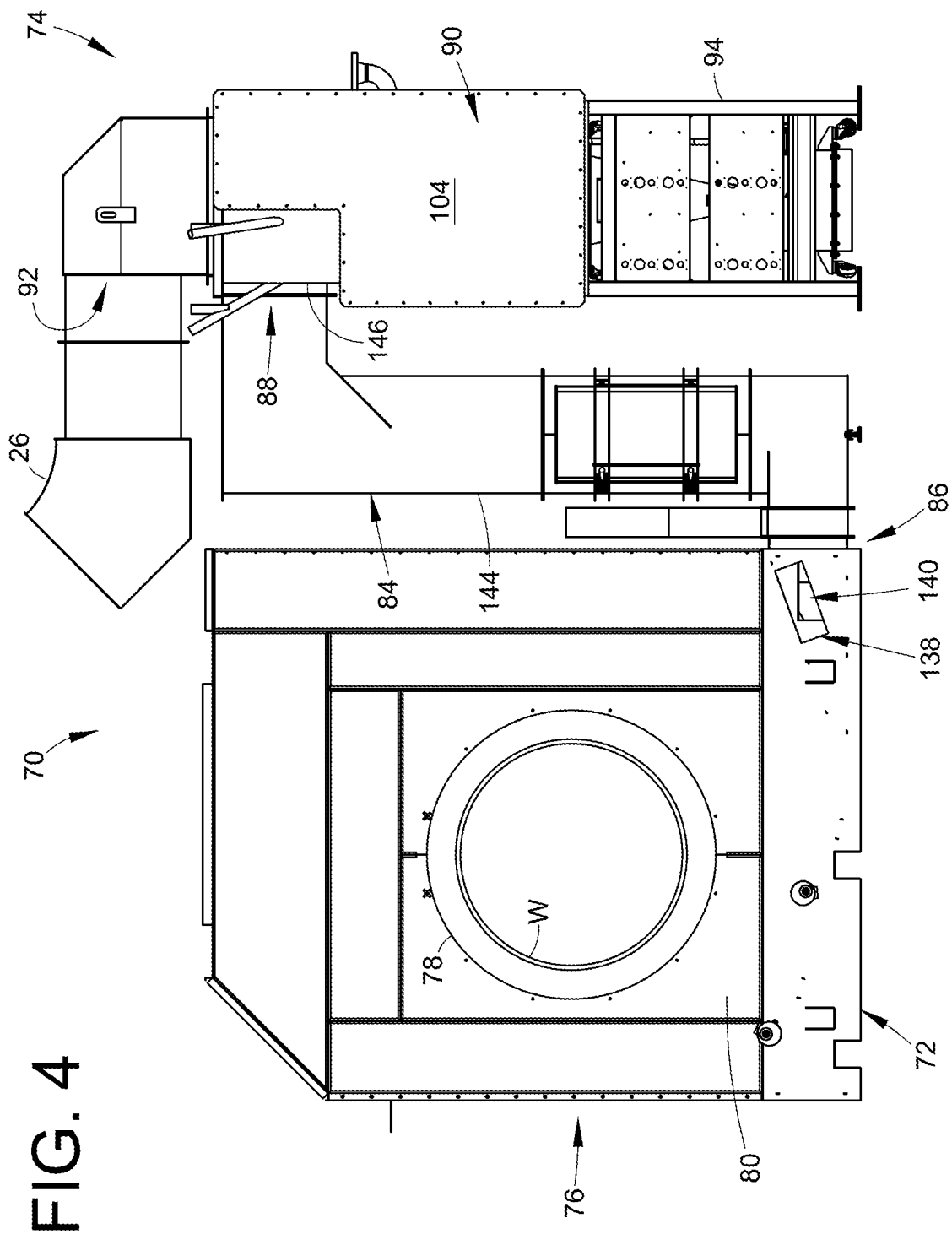
FIG. 4 is a side view of the embodiment of FIG. 1.
Figure 5:
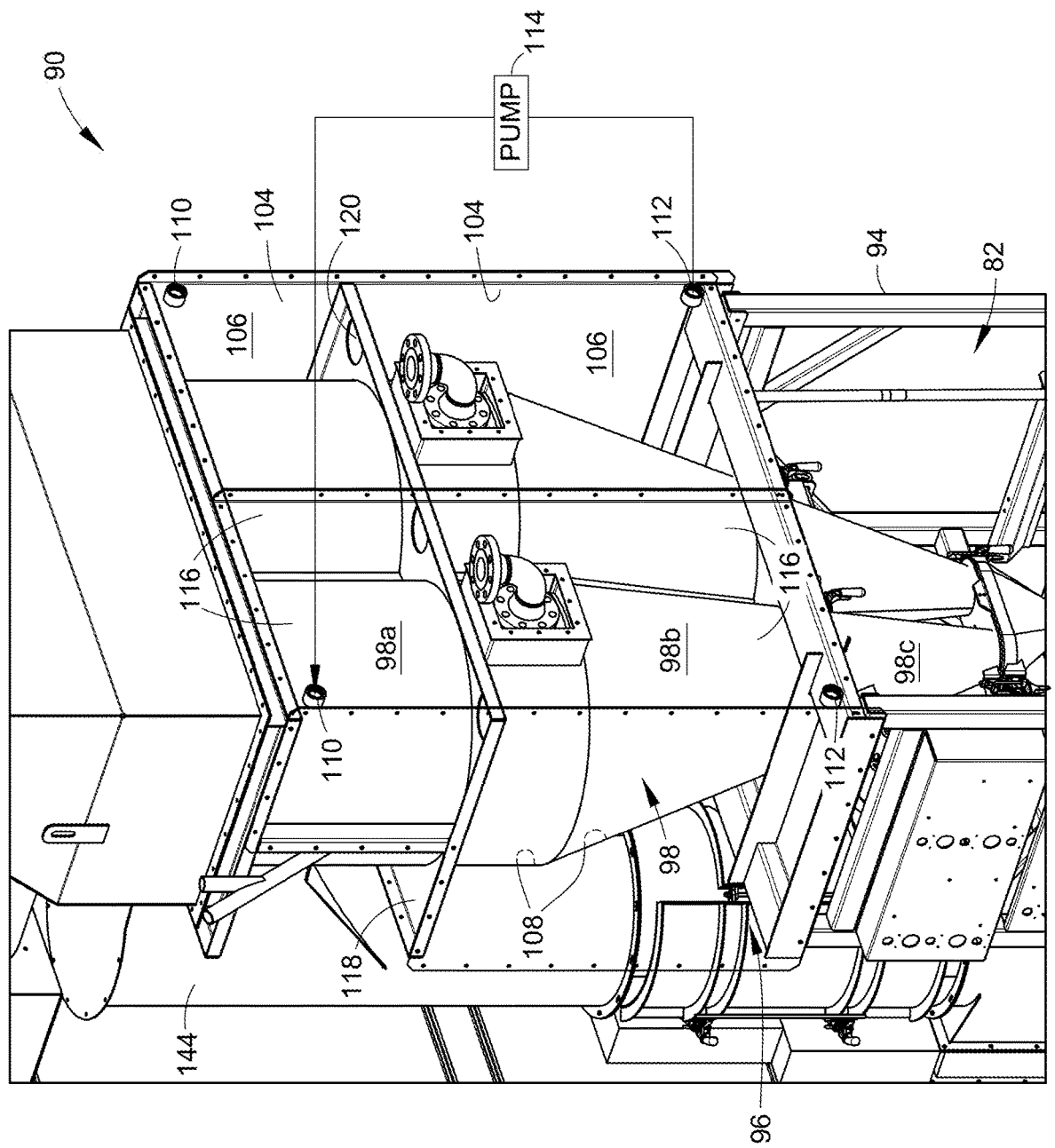
FIG. 5 is an enlarged back side perspective view of an enclosure for a cyclone of the embodiment of FIG. 1 with the enclosure walls shown in transparency for illustrative purposes.
Figure 6:
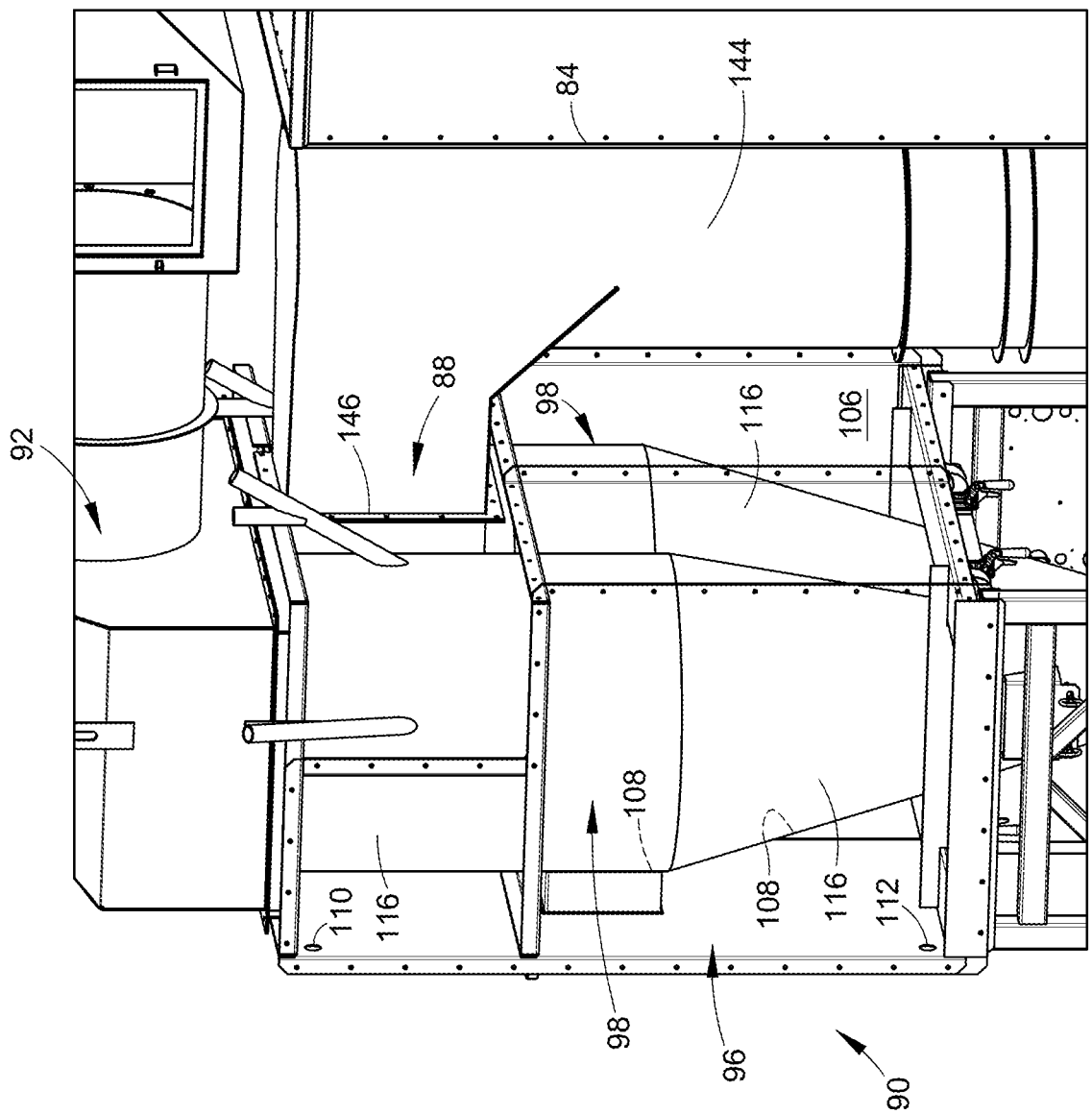
FIG. 6 is an enlarged perspective view of the enclosure depicted in FIG. 5 from an opposite side with the enclosure walls shown in transparency for illustrative purposes.
Figure 7:
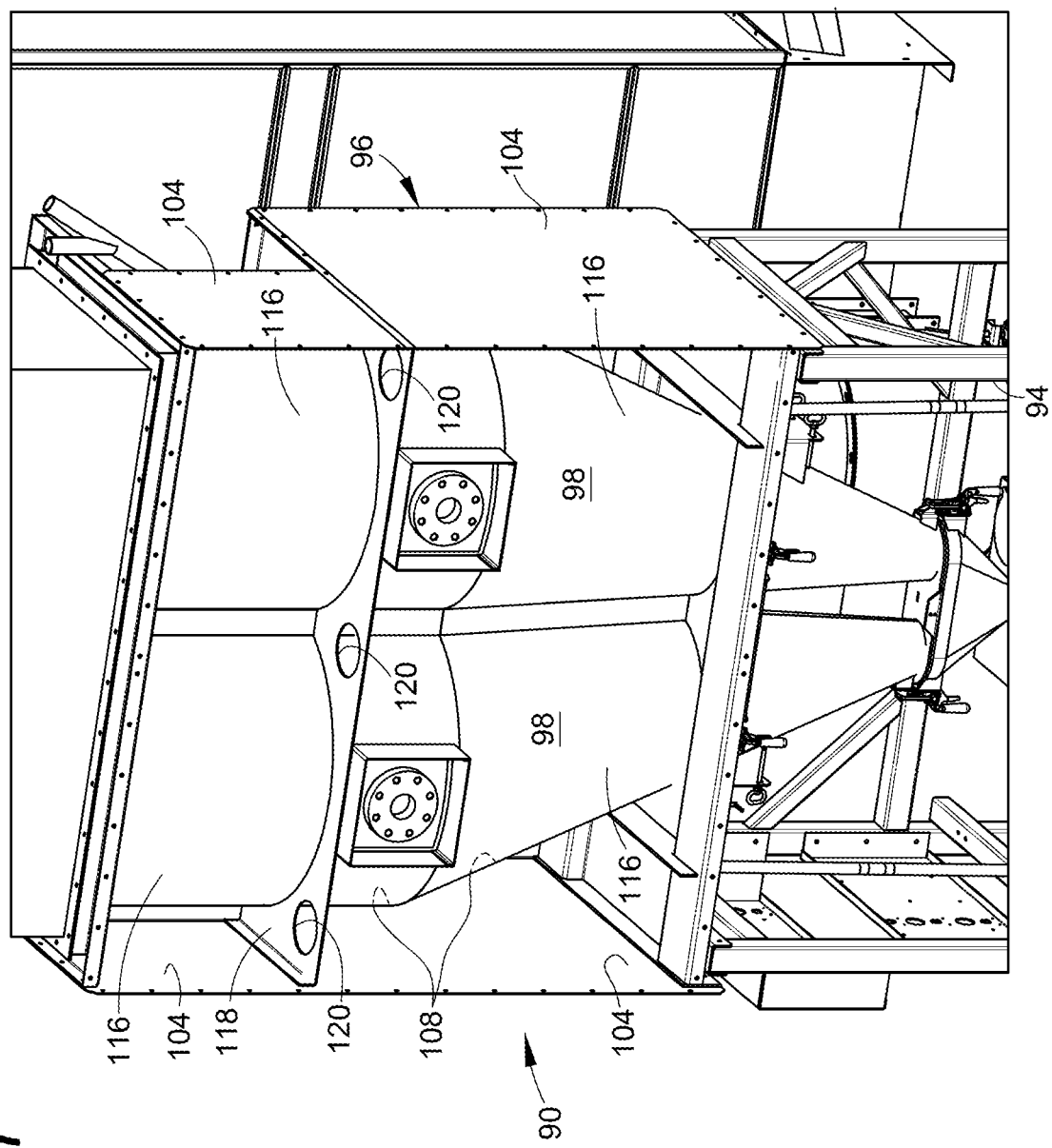
FIG. 7 is an enlarged perspective view of the enclosure depicted in FIG. 5 with a back wall of the enclosure removed.

FIGS. 5-7 illustrate in more detail the enclosure 90 for the cyclone 82. The enclosure 90 may be realized in the form of a jacket or shell 96 that is supported on the frame 94. The jacket 96 forms a fluid-tight enclosure that at least partially surrounds the cyclone body 98. The cyclone body 98 comprises the cyclone wall structure within which the process air becomes drawn into a vortex for separating powder from the air. The cyclone body 98 typically may include a cylindrical section 98a, an upper conical section 98b and a lower conical section 98c. The cylindrical section 98a and the upper conical section 98b may be welded together or otherwise held together and preferably are stationary and may be fixed to the frame 94. The cylindrical section 98a and the upper conical section 98b form a cyclone upper portion 100 (see FIG. 11). The lower conical section 98c forms a cyclone lower portion 102 (see FIG. 11). Although in this embodiment the lower cyclone portion 102 is moveable (as further described below) such need not be the case. In an embodiment in which the lower cyclone portion 102 is fixed, then the enclosure 90 optionally may enclose all or a portion of the cyclone lower portion 102 as well.

The enclosure 90 encloses a portion of the cyclone body 98, for example, a portion of the cyclone upper portion 100. The enclosure 90 may only enclose a portion of the cyclone body 98 due to, for example, the geometry of the powder inlet 88. In alternative embodiments, for example an embodiment with a single cyclone, the enclosure 90 may enclose an entire upper portion of the cyclone.

The enclosure 90 may include a series of panels 104 that are sealed in a fluid-tight manner as needed and supported on the frame 94. The panels 104 are shown in transparency in FIGS. 5 and 6, but may be made of a suitable material for containing a fluid 106. In an embodiment, the fluid may be water. Depending on the cooling energy needed to reduce the temperature of the cyclone interior surfaces 108 (see FIG. 7) to a desired temperature, the water 106 may be simply taken from a commercial supply such as tap water, or may be conditioned as needed to reduce the water temperature. The enclosure 90 may include fluid inlets 110 and fluid outlets 112, along with a pump 114 that may be used to circulate the fluid through the enclosure 90. In an embodiment it is preferred but not required that the fluid enters and exits the enclosure 90 at distant locations to maximize flow through the enclosure 90 and for contact and thermal exchange with as much surface area of the exterior surface 116 of the cyclone body 98. Multiple inlets 110 and outlets 112 shown in the figures may be used as needed. Although only used as an example, for a typical twin cyclone 82 the enclosure 90 may contain a volume of 400 gallons of the fluid 106 or more, and for other embodiments the enclosure 90 might be smaller and contain less than 400 gallons of the fluid 106. The dimensions of the enclosure 90 and volume capacity will in part be determined by the dimensions of the cyclone 82, as well as the volume and flow rate of fluid 106 needed to provide the desired temperature reduction of the interior surface 108 of the cyclone 82. Should an embodiment utilize a divider wall 118 due to the cyclone geometry, fluid passageways 120 may be provided as needed to assure even and open flow of the fluid 106 through the enclosure 90 (see FIG. 7.)

Reducing the temperature of at least a portion of the cyclone body 98 may help reduce impact fusion of powder coating material within the cyclone 82. For example, when large pipe that is being coated is heated as described above, the process air may be hot enough that impact fusion more readily occurs on the interior surfaces 108 of the cyclone 82. By cooling the interior surfaces 108 the cyclone 82, this tendency for impact fusion can be reduced. In an example of the enclosure 90, for example in an embodiment of a water jacket, water flowing through the enclosure 90 contacts the enclosed portion of the exterior surface of the cyclone body 98, thereby being in thermal or heat exchange with the exterior surfaces 116 the cyclone body 98. This thermal exchange will reduce the interior surface 108 temperature of the cyclone 82. A number of variables may be adjusted or controlled to achieve the desired interior surface temperature. The cooling fluid 106, such as water, may be used from commercial water supply, or may be cooled as needed. The fluid 106 removes heat from the cyclone body 98 and may optionally be pumped through a heat exchanger for cooling before being recycled back through the enclosure 90. The temperature of the interior surfaces 108 of the cyclone will depend in part on the thermal conductivity between the exterior surfaces 116 and the interior surfaces 108 of the cyclone body 98. Stainless steel sheet metal has excellent thermal conductivity but other materials may alternatively be used as needed. The enclosure 90 may optionally be insulated to increase the heat exchange efficiency. Other techniques may be use to increase the heat exchange between the fluid 106 and the cyclone body 98. Depending on the heat exchange efficiency it may be optional to operate the pump 114 periodically rather than continuously.

As depicted in FIGS. 5-7, the enclosure 90 may not enclose a region of the cylindrical section 98a of the cyclone body 98. Accordingly, this region of the cylindrical section 98a of the cyclone body 98 may not receive direct cooling via the fluid 106 that is introduced into the enclosure 90. Nonetheless, powder overspray entrained in process air that first enters the cyclone body 98 via the powder inlet 88 may not fuse or stick to the interior surfaces 108 of the cyclone 82 due to its high travelling velocity as it enters the cyclone 82. Moreover, the geometry of the cyclone 82 favors larger particles travelling closer to the interior surfaces 108 of the cyclone 82, and such particles being larger in size are less likely to melt and stick to the inner surface of the cyclone 82. The enclosure 90 also encloses a substantial region of the cyclone body 98; therefore, the partial enclosure still allows most of the surface area of the cyclone body 98 in the upper portions to be cooled. Depending on the thermal conductivity of the material forming the cyclone body 98, this cooling may also travel into the regions that are not enclosed. Accordingly, the embodiment of the powder recovery system 74 is able to effectively reduce the impact fusion of powder coating material within the cyclone 82 even without entirely covering the cyclone body 98.

By the time the powder overspray settles out of the air flow within the cyclone 82, the powder overspray has cooled due to its travel through the cyclone upper portion 100. Therefore, it also may not be necessary to have the enclosure 90 enclose the lower cyclone portion 102, which may not be exposed to higher temperatures.

Figure 8:
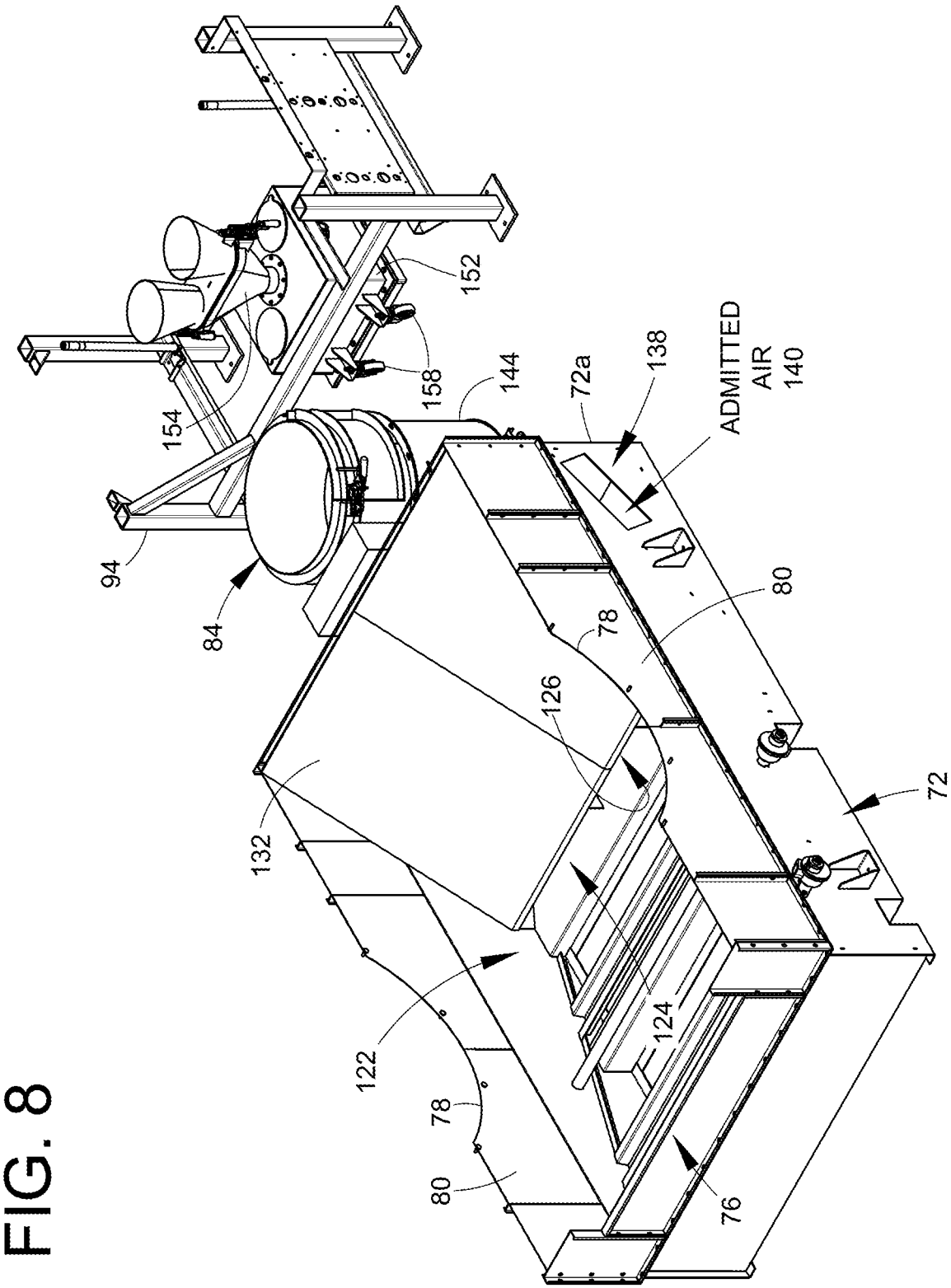
FIG. 8 is an enlarged cross-sectional view of the embodiment of FIG. 1 taken along line 8-8 in FIG. 2.
Figure 9:
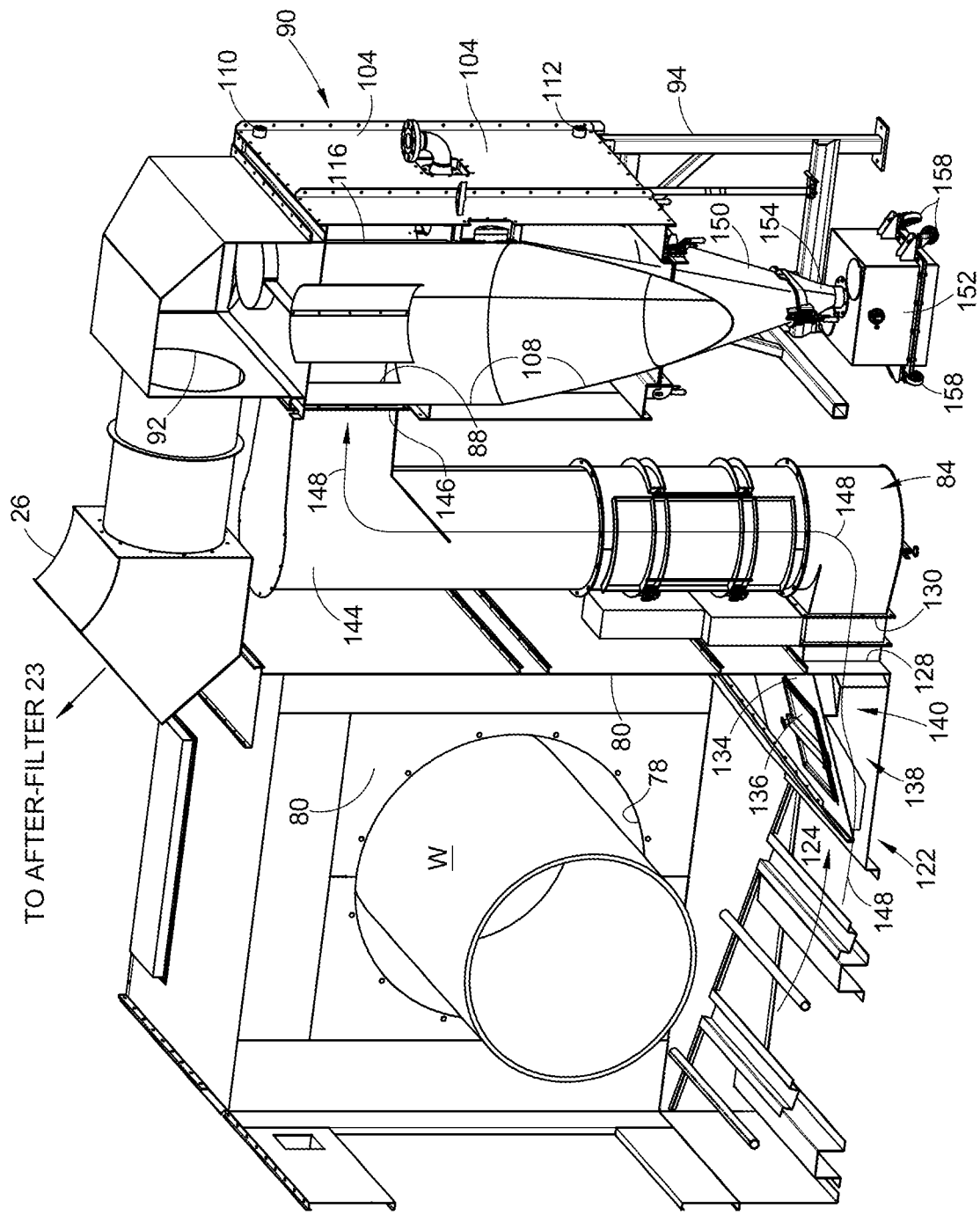
FIG. 9 is a cross-sectional view of the embodiment of FIG. 1 taken along line 9-9 of FIG. 2.
Figure 10:
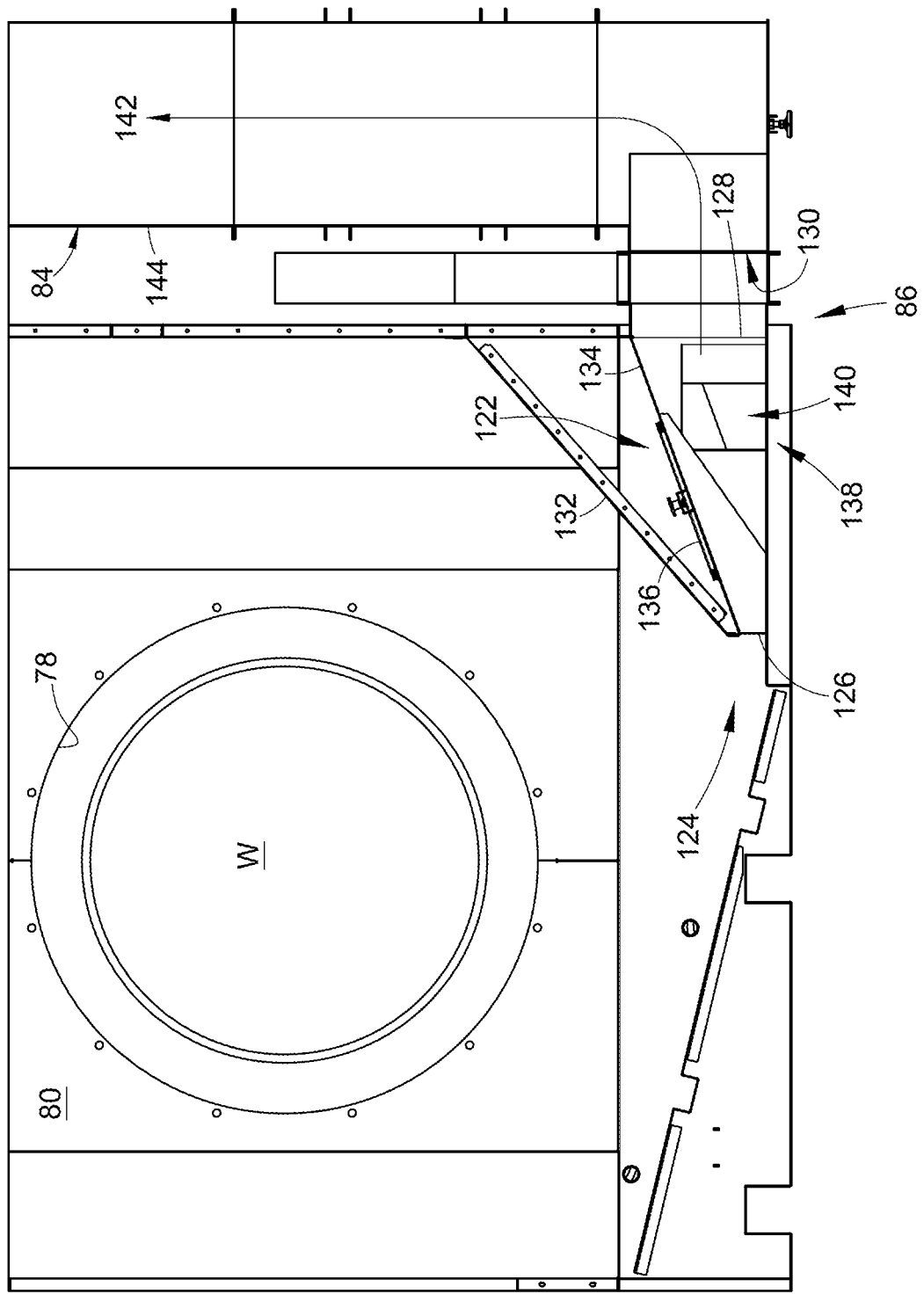
FIG. 10 is a side view of a lower portion of a spray booth of the embodiment of FIG. 1 with a side booth wall of the spray booth removed.

With reference to FIGS. 8-10, several sectional views are provided to illustrate powder flow via the process air that is drawn through the spray booth 72 and the suction duct 84 into the cyclone 82. The spray booth 72 floor includes a recovery duct 122 at an outlet end of the spray booth. The recovery duct 122 forms a plenum for the process air 124 to exit the spray booth 72, and is under negative pressure due to the air flow induced by the after-filter system 23. The process air 124 flow is represented by the arrow 124 and as noted hereinabove, the process air 124 includes containment air drawn into the spray booth 72 by the after-filter system 23 via the cyclone 82, along with entrained powder overspray. The recovery duct 122 has a recovery duct inlet 126 and a recovery duct outlet 128. The recovery duct outlet 128 serves as the aforementioned process air outlet 86 of the spray booth 72 (see FIG. 2), and is in fluid communication with an inlet 130 to the suction duct 84. An optional cover panel 132 is provided over the recovery duct 122 so that powder overspray that is in the back region of the spray booth 72 will fall and be shed by the cover panel 132 into the recovery duct inlet 126. The cover panel 132 may be angled to promote shedding of powder overspray into the recovery duct 122. For example, the cover panel 132 may be for example angled at about 60 degrees relative to horizontal. An upper panel 134 of the recovery duct may include an inspection door 136 that may be opened or removed (after removal/opening of the optional cover panel 132) to inspect visually and clean the interior of the recovery duct 122 during color change or other maintenance activities.

An opening 138 is provided into the recovery duct 122. The opening 138 may be used for admitting air 140, preferably ambient air, from the surrounding environment of the powder coating system 10 to be added to the process air 124. The same suction that draws the process air 124 into the recovery duct 122 through the recovery duct inlet 126, may be used to draw the admitted air 140 into the recovery duct 122. Preferably, but not necessarily, the admitted air enters the recovery duct 122 laterally relative to the general flow direction of the process air 124 into the recovery duct 122. The admitted air 140 may be used for a variety of purposes. For example, the admitted air 140 may be used as supplemental air to dilute the process air 124, because in some applications such as dense phase coating processes, the process air may be too rich in powder. The admitted air 140 may also or alternatively be used for cooling the process air 124 before the process air 124 passes into the cyclone 82. As an example for large pipe coating operations, the process air entering the recovery duct 122 may be approximately 140° F., but by admitting cooler ambient air the process air temperature may be reduced to 120° F. These numbers are intended to be exemplary and will be different for different coating operations, powder coating materials, workpieces and so on.

The flow rate and volume of admitted air 140 into the powder overspray flow path through the opening 138 may be optionally controlled by providing moveable baffles or a moveable door at the opening 138 so as to allow adjustment of the amount of admitted air 140 being added. This may be useful, for example, if environmental conditions of the ambient air characteristics change. Many other techniques may be used to control the admitted air 140 flow rate and volume.

Although ambient air is preferred, the admitted air flow into the lateral opening 140 may be conditioned, for example by cooling or reducing humidity. It is also preferred that the admitted air 140 enter the recovery duct 122 near or in close proximity to the recovery duct outlet 128. More generally, it is preferred that the admitted air 140 be added to the process air 124 before the process air 124 enters the cyclone. By having the opening 138 to the recovery duct 122, the admitted air 140 mixes with the process air before traveling the distance of the suction duct 84 from the spray booth to the cyclone to allow further time for the process air to cool.

The suction duct inlet 130 receives the process air 124 flow that is combined with the admitted air 140 to provide a powder overspray flow 142 (FIG. 10.) The suction duct 84 has a vertical pipe section 144 and a suction duct outlet 146 that is in fluid communication with the cyclone powder inlet 88. The suction duct 84 conveys the powder overspray flow 142 to the cyclone powder inlet 88 from the recovery duct outlet 128. The term "powder overspray flow path" as used herein refers to the passageway and flow path 148 that conveys the powder overspray which is entrained in the containment air to form the process air 124 from the spray booth 72 to the cyclone 82. In an embodiment as illustrated, the powder overspray flow path 148 may include the recovery duct 122 and the suction duct 84 (see FIG. 9.) It is preferred although not required that the opening 138 be open to the powder overspray flow path 148 in the recovery duct 122, but alternatively the opening 138 to the powder overspray flow path 148 may be located anywhere along the powder overspray flow path 148, for example, in the suction duct 84.

Methods for cooling the process air described herein, including the use of a cyclone 82 that is cooled using an enclosure 90, and the use of supplemental air 140 that is admitted to the process air 124 flow through an opening 138 in the powder overspray flow path 148, may be used to manipulate or influence the rate of impact fusion of the powder overspray on the cyclone interior surface 108. The admitted air 140 may be used to reduce the temperature of the process air 124 before the powder overspray entrained air enters the cyclone powder inlet 88. The admitted air 140 may also be used to dilute the air/powder ratio of the process air 124, especially for embodiments that use dense phase powder application processes. The admitted air 140 may be ambient air, and if the ambient air is in a warm environment, the cooling fluid 106 may be lowered in temperature, or the ambient air may be conditioned before being admitted into the process air 124 flow. In order to determine the needed amount of cooling provided by the fluid 106, the powder coating system 10 may be operated with the admitted air opening 138 fully open and measuring the inlet temperature of the powder overspray flow 142 into the cyclone. The cooling fluid temperature may then be selected to provide the desired interior surface temperature of the cyclone body.

Although the exemplary embodiment illustrates an enclosure 90 in the form of a water jacket to provide thermal transfer to lower the temperature of the interior surface 108 of the cyclone, other techniques and arrangements may be used to lower the temperature of the interior surface of the cyclone 82. For example, in the separate embodiment depicted in FIGS. 16-18, an enclosure 290 may be used for containing cooled air 206 instead of a liquid.

Higher temperature of the powder overspray in some embodiments may result in powder agglomeration in the exhaust air from the cyclone. A screw conveyor and hopper (not shown) may be used in the after-filter system 23 to break up these agglomerations before the powder is recovered for re-use.

The fluid 106 may be internally recycled through the enclosure 90, although depending on the temperature increase in the fluid it may be necessary to chill the fluid before it reenters the enclosure 90. Alternatively, rather than recycling the fluid 106, the fluid that leaves the enclosure 90 may be used to help quench the workpiece W as it exits the spray booth 72.

Figure 11:
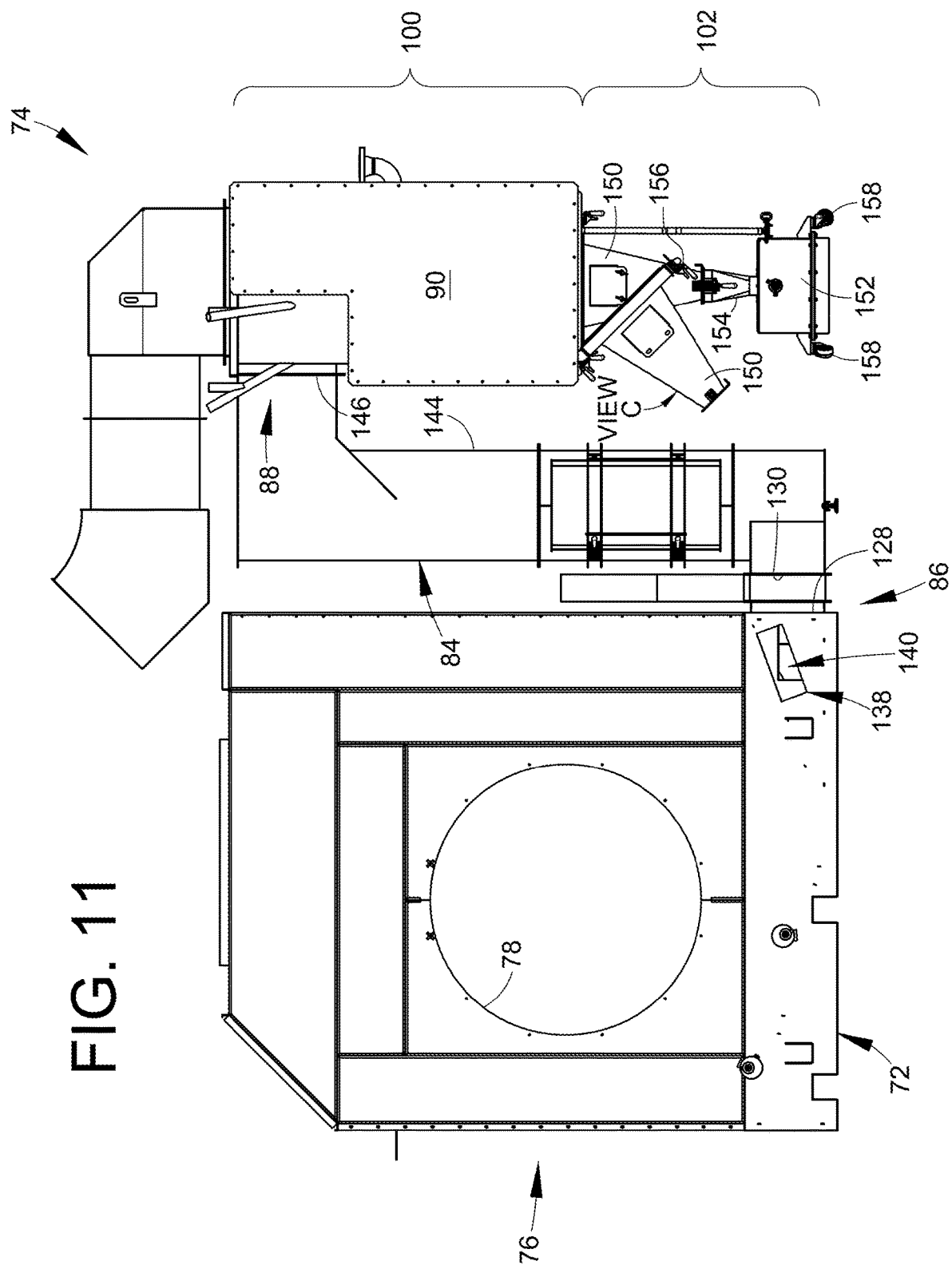
FIG. 11 is a side view of the embodiment of FIG. 1.
Figure 13:
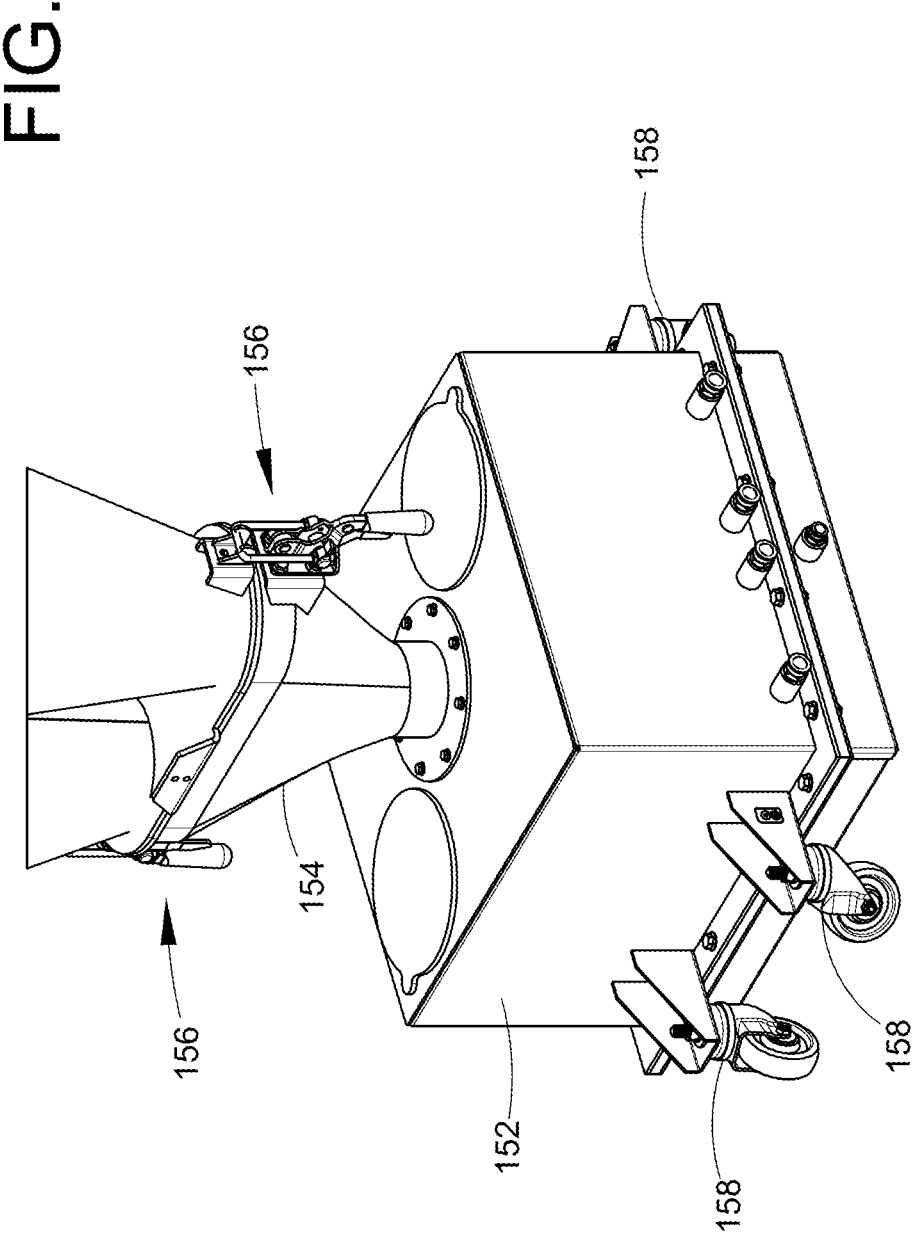
FIG. 13 is an enlarged view of a powder receptacle.

With reference to FIGS. 11 and 13, the cyclone 72 includes the stationary upper portion 100 and the lower portion 102. The lower portion 102 of the cyclone is not enclosed by the enclosure 90 because in some embodiments it may be desirable to have the lower portion 102 moveable for cleaning and color change operations. In an embodiment, the lower portion 102 may include a lower conical section 150 and a receptacle 152. The receptacle 152 receives the powder coating material that is separated during operation of the cyclone 82. The receptacle 152 may include a conical inlet 154 that is releasably connectable to a lower end of the lower conical section 150. For example, latches 156 may be used to releasably secure the receptacle 152 to the lower conical section 150 (see FIG. 13). When released from the lower conical section 150, the receptacle 152 may be removed or relocated for color change or cleaning and a new receptacle moved into position under the cyclone and connected to the lower conical section 150. The receptacle 152 may include casters 158 or other suitable means to more easily move the receptacle to a desired location.

Figure 14:
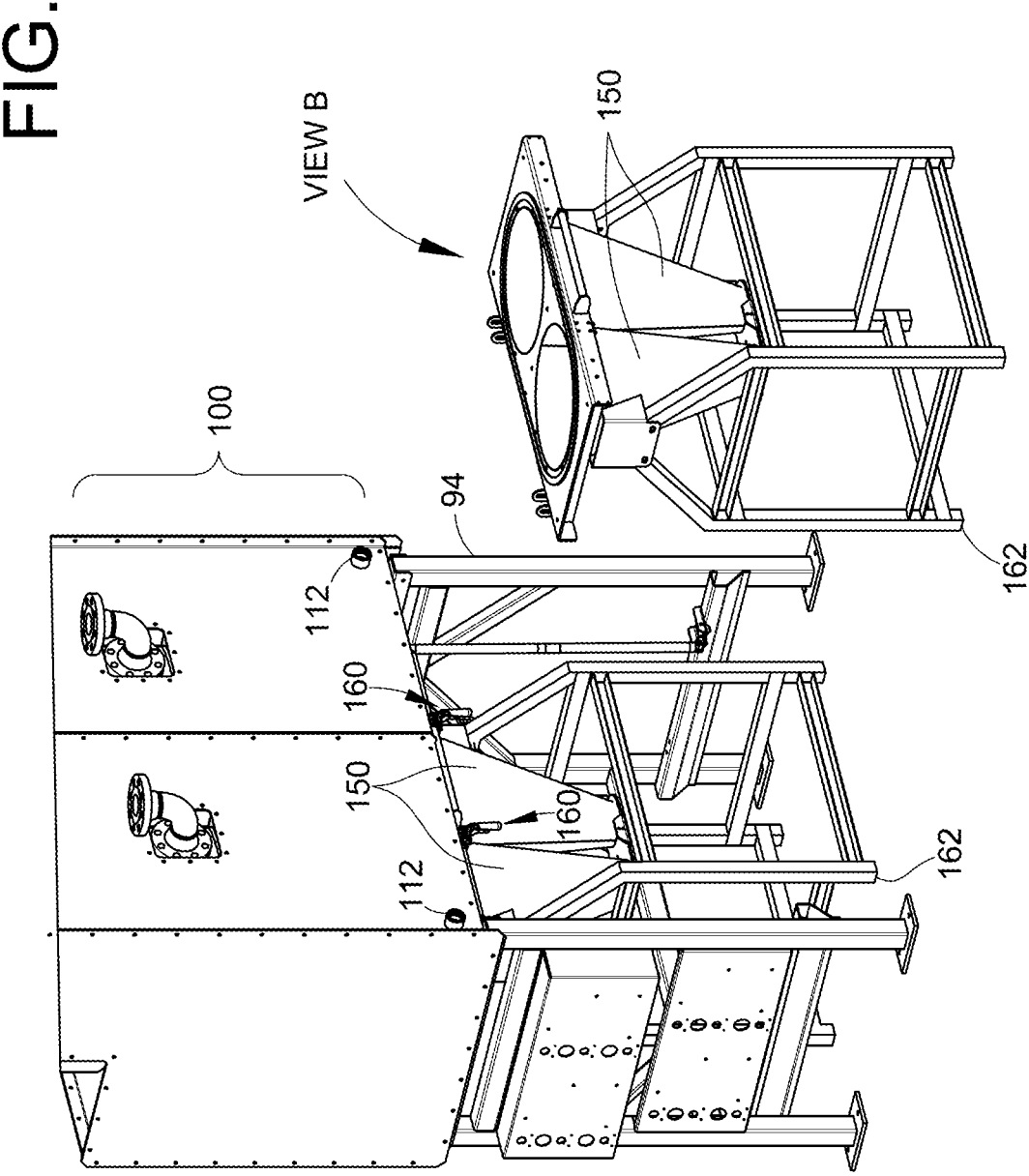
FIG. 14 is a perspective view of a lower portion of a powder recovery system of the embodiment of FIG. 1 showing a moveable lower portion of a cyclone in View B.

With reference to FIG. 14, the lower conical section 150 may be connected to the upper portion 100 of the cyclone by a second set of latches 160. A support frame 162 may be positioned under the lower conical section 150 (after the receptacle 152 has been disconnected and moved away) and raised into contact with the support frame 162, such as by using a forklift or other suitable means. The latches 160 may then be released and as shown the lower conical section 150 moved away from the upper portion 100 of the cyclone, as represented in the view B. After cleaning, the lower conical section 150 may be repositioned and connected to the upper portion 100 of the cyclone and the support frame 162 then removed.

Figure 15:
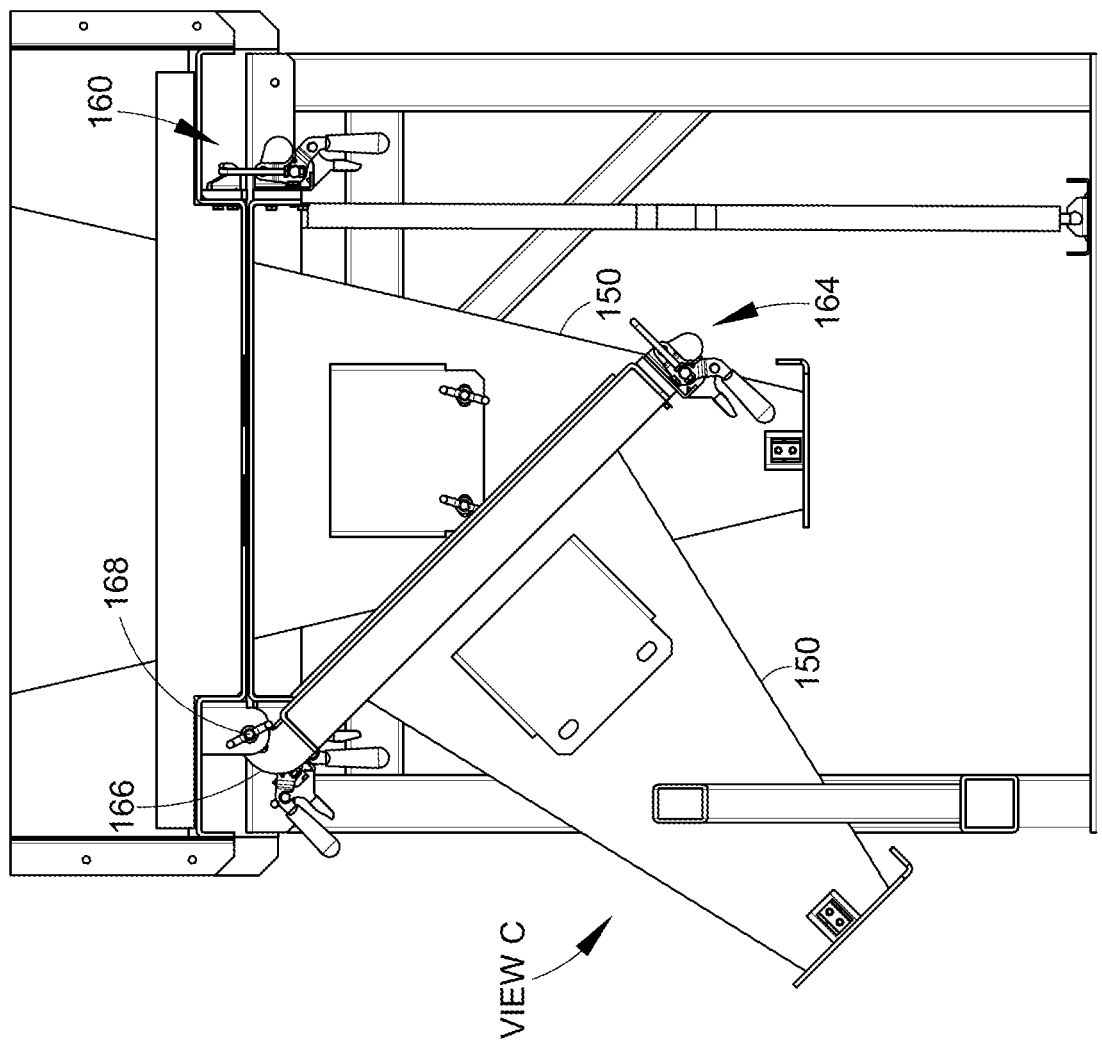
FIG. 15 is an enlarged elevation view of a hinged lower portion of a cyclone of the embodiment of FIG. 11 showing a pivoted position in View C.

With reference to FIG. 11 and FIG. 15, the lower conical section 150 of the cyclone may also be connected by a third set of latches 164 to the upper portion 100 of the cyclone with a hinge 166. The hinge 166 may be a hinge pin 168 for example. With the second set of latches 160 connecting the lower conical section 150 to the upper portion 100 of the cyclone, the third set of latches 164 may be released thereby allowing the lower conical section to pivot about the hinge 166 and swing to a second position for cleaning or other maintenance. This second position is illustrated in FIGS. 11 and 15 as view C. When both the hinged connection with the latches 164 and the release connection with the latches 160 are used together, in order to remove the lower conical section 150 via the support frame 162, the latches 164 may first be released and the hinge pin 168 removed.

Figure 16:
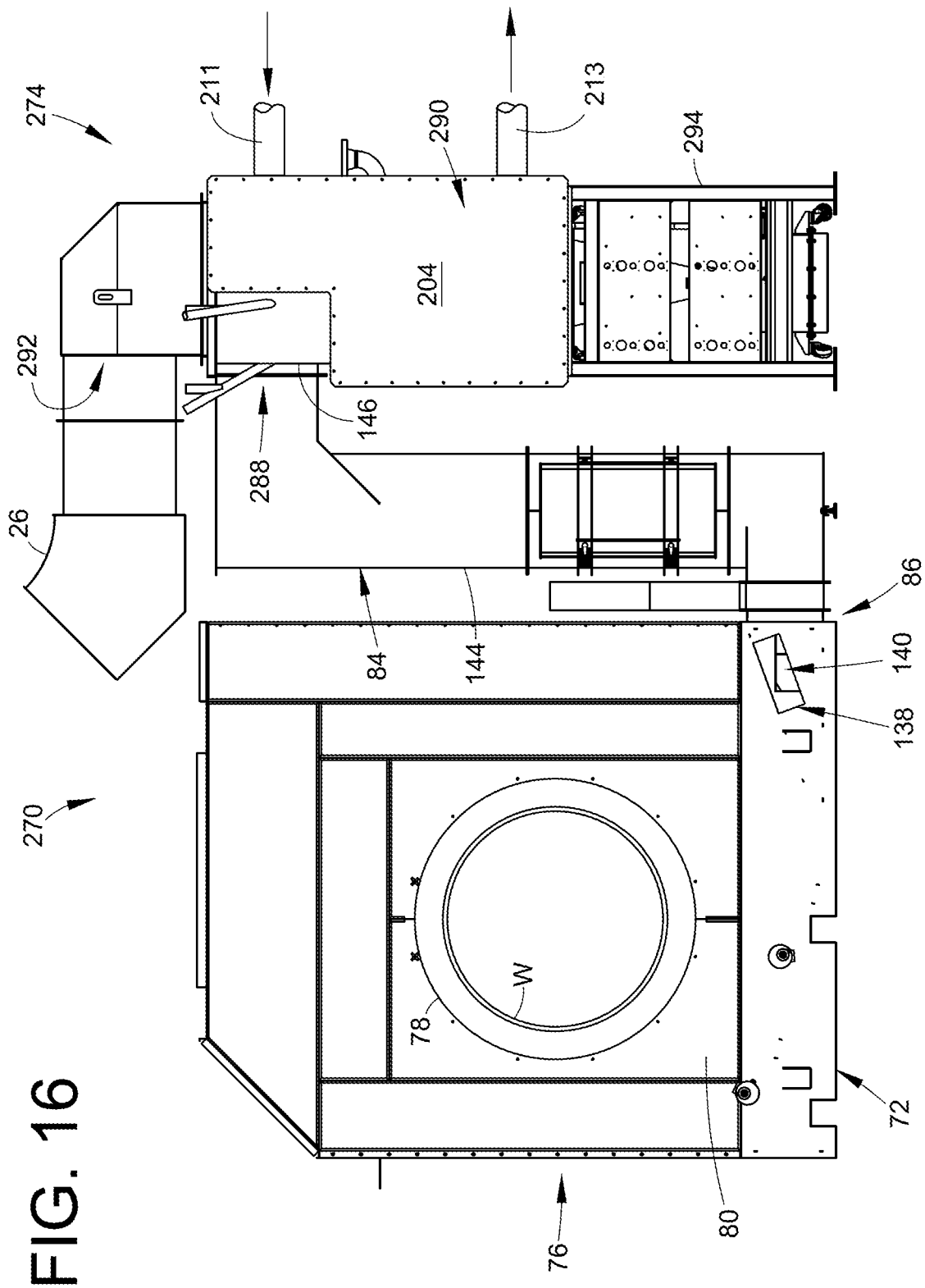
FIG. 16 is a side perspective view of a second embodiment of a powder coating system in accordance with the present disclosure.
Figure 17:
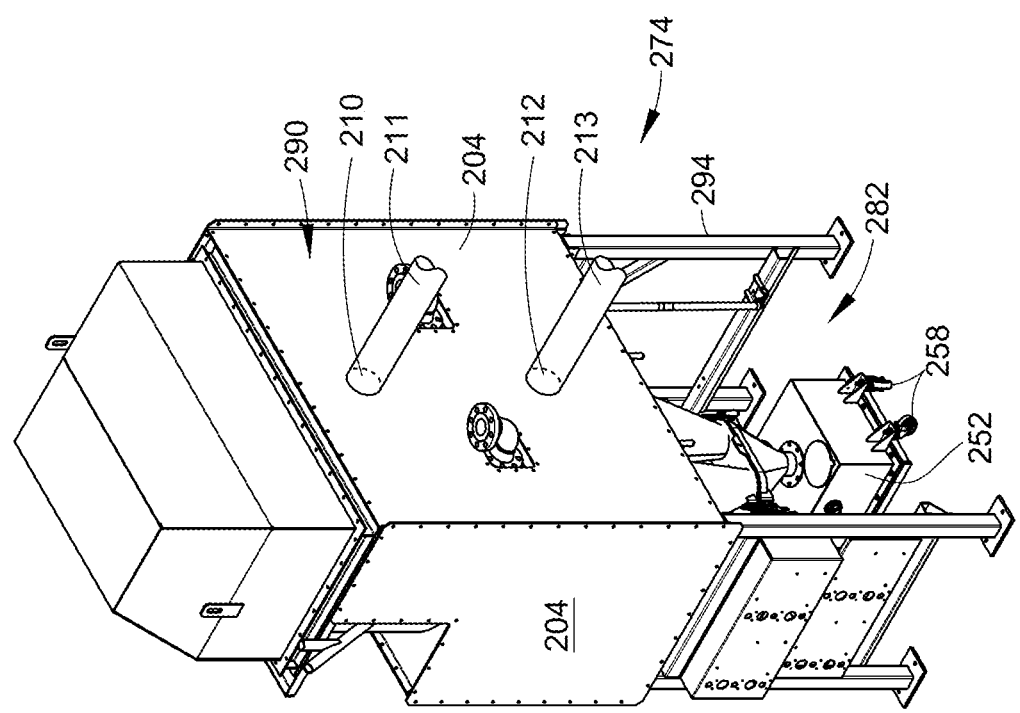
FIG. 17 is a perspective view of a powder overspray recovery system of the powder coating system shown in FIG. 16.
Figure 18:
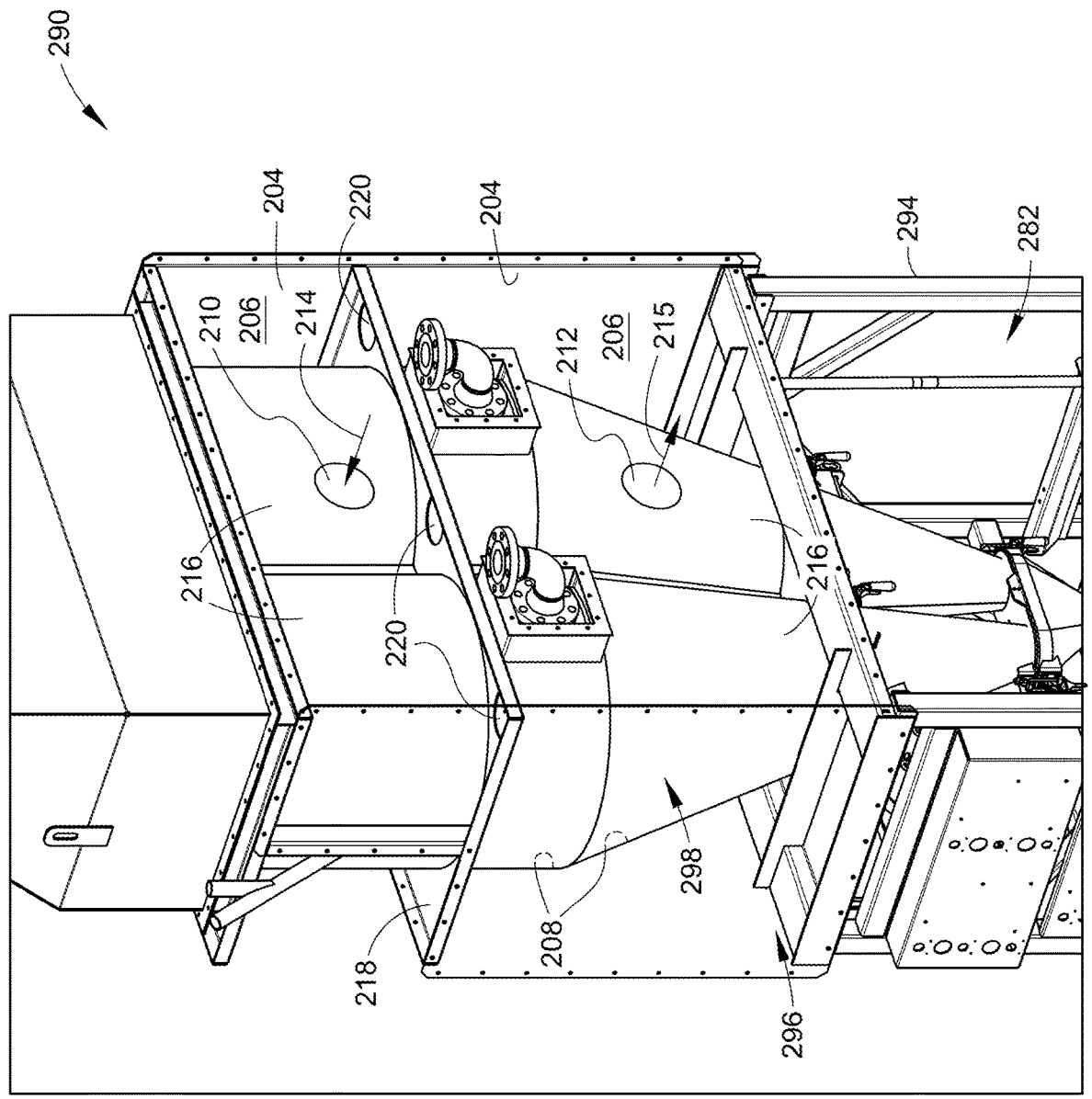
FIG. 18 is an enlarged back side perspective view of an enclosure for a cyclone of the powder coating system shown in FIG. 16 with the enclosure walls shown in transparency for illustrative purposes.

With reference to FIGS. 16-18, a second exemplary embodiment of a powder coating system 270 is accordance with the present disclosure is described. The powder coating system 270 may include the same spray booth 72 as the powder coating system 70 described with reference to FIGS. 1-15. The powder coating system 270 may also include the same suction duct 84. As described above, the suction duct 84 includes a vertical pipe section 144 and a suction duct outlet 146. The powder coating system 270 further includes a powder recovery system 274.

As depicted in FIG. 16, the spray booth 72 may be coating a workpiece W with powder coating material. The powder coating material may be applied to the workpiece W via spray guns (not depicted). In certain applications, the spray booth 72 may comprise up to 40-50 spray guns. In order to improve adherence or fusion of the powder coating material to the workpiece W, the workpiece W may be heated prior to being introduced into the spray booth 72. Excess powder coating material that does not adhere to the surface of the workpiece W may be collected at the bottom of the spray booth 72 and entrained in air that carries the excess powder or overspray powder into the powder recovery system 274. The powder entrained air or process air may be drawn out of the bottom of the spray booth and into the powder recovery system 274 by suction that is applied by a blower and after filter system, such as the blower and after filter system 23 depicted in FIG. 12.

Due to the high temperature of the workpiece W, however, heat that radiates from the workpiece W may heat the surrounding air to temperatures of 120° F. or higher. Such temperatures may be close to the temperature at which the powder coating material may melt and become sticky. In conventional powder coating systems, the sticky overspray powder may adhere to various surfaces of the powder recovery system (such as, for example, the interior surface of the cyclone) and/or become caught in the after-filter system, leading to a constant need to clean the powder recovery system and/or premature failure of the after-filter system. The powder coating system 270 addresses this problem in conventional systems by using methods to cool the process air as it travels through the powder recovery system 74, as described below.

The powder recovery system 274 may be used to recover powder overspray entrained in process air during and/or after a coating operation. The powder recovery system 274 includes a cyclone 282 (see FIG. 18). While the cyclone 282 that is illustrated is a twin or double cyclone design, one or ordinary skill in the art would appreciate that other cyclone designs may be used, such as, a single cyclone design. The cyclone 282 comprises a cyclone body 298. The cyclone body 298 includes a powder inlet 288, which is in fluid communication with the suction duct outlet 146 of the suction duct 84. The suction duct 84 provides a flow path for the process air entrained with powder overspray to travel from the spray booth 72 into the powder recovery system 274. The powder recovery system 274 further includes an exhaust outlet 292, which connects to the blower and after filter system. The exhaust outlet 292 of the cyclone 282 receives the process air from the cyclone 282 after most of the entrained powder has been removed via the vortical flow that is induced within the cyclone 282 (see FIG. 12, vortex 36).

As depicted in FIGS. 16-18, an enclosure 290 encloses at least a portion of the cyclone 282. The enclosure 290 may be an outer jacket or shell 296 that is supported on a frame 294. The jacket 296 may include a series of panels 204 that are fastened together, for example, using mechanical screws, bolts, or the like. In certain aspects of the disclosure, the panels 204 may also be welded together or held together using adhesives, or the like. The enclosure 290 may provide an enclosed space for a cooling medium 206 such as air. The cooling medium 206 may be used to cool one or more interior surfaces 208 of the cyclone 282. Depending on the cooling energy needed to reduce the temperature of the cyclone interior surfaces 208 to a desired temperature, the cooling medium 206 may consist of ambient air (e.g., air taken from the nearby environment) or refrigerated air. The refrigerated air may be chilled using a commercial air conditioning unit or other cooling type unit.

The enclosure 290 may include an inlet 210 and an outlet 212. The inlet 210 may be connected to a first conduit 211 for supplying the cooling medium 206 into the enclosed space defined by the enclosure 290, and the outlet 212 may be connected to a second conduit 213 for receiving return air from the space defined by the enclosure 290 and passing the air back to a cooling unit to be cooled again for re-introduction into the enclosure 290 or to a disposal unit for releasing the air back to the outside. The first conduit 211 and the second conduit 213 may be connected to one or more fans (not depicted) that direct the air into and out of the enclosed space defined by the enclosure 290. In certain applications, the first conduit 211 and the second conduit 213 may have 8 inch diameters. In certain applications, the first conduit 211 and the second conduit 213 may be located at distant locations to maximize flow through the enclosure 290 for contact and thermal exchange with as much surface area of an exterior surface 216 of the cyclone body 298.

The powder recovery system 274 further includes a divider wall 218 to provide support for the cyclone 282. The divider wall 218 may be positioned at a point along the length of the cyclone 282. The divider wall 218 may include one or more openings 220 (see FIG. 18) for allowing the cooling medium 206 to travel from a top portion of the enclosure 290 into the bottom portion. As such, the cooling medium 206 may enter the enclosure 290 from the inlet 210, as represented by an arrow 214 in FIG. 18, and exit the enclosure 290 from the outlet 212, as represented by an arrow 215 in FIG. 18.

In certain aspects of the disclosure, the jacket 296 of the may form a fluid-tight enclosure that at least partially surrounds the cyclone body 298. In such aspects, the panels 204 of the jacket 296 may be wielded together to prevent leakage of the cooling medium 206 out of the enclosed space defined within the jacket 296. Nonetheless, it may be costly to form the jacket 296 in a fluid-tight manner. Thus, in other aspects, the jacket 296, while decreasing the amount of cooling medium 206 that may escape from the jacket 296 to the surrounding environment, may not form a fluid-tight enclosure. For example, when the cooling medium 206 is air, it may not be necessary to form the jacket 296 so as to provide a fluid-tight seal. While a small amount of air may escape from the jacket 296 to the surrounding environment, a majority of the air would be held within the jacket 296 and serve the purpose of cooling the cyclone body 298.

As noted above with respect to the embodiment of the powder recovery system 274 depicted in FIGS. 1-15, reducing the temperature of at least a portion of the cyclone body 298 may help reduce impact fusion of powder coating material within the cyclone 282. In an aspect of the disclosure, the cooling medium 206 flowing through the enclosure 90 (e.g., air moving through the enclosure 90) may contact the exterior surface 216 of the cyclone body 298, thereby being in thermal or heat exchange with the exterior surface 216 the cyclone body 298. This thermal exchange will reduce a temperature of the interior surface 208 of the cyclone 282. The temperature of the interior surfaces 208 of the cyclone 298 will depend in part on the thermal conductivity between the exterior surfaces 216 and the interior surfaces 208 of the cyclone body 298. As such, a material such as stainless steel sheet metal or another material with high thermal conductivity may be used to form the cyclone body 298. In certain aspects of the disclosure, the enclosure 90 may also be formed of an insulating material so that cooling energy from the cooling medium 206 is mostly absorbed by the cyclone body 298.

While a single inlet 210 and a single outlet 212 are depicted in FIGS. 16-18, one of ordinary skill in the art would appreciate that more than one inlet and outlet may be disposed at various locations along the enclosure 290. The dimensions of the enclosure 290 and volume capacity will in part be determined by the cyclone dimensions, as well as the volume and flow rate of cooling medium 206 needed to provide the desired temperature reduction of the interior surface 208 of the cyclone.

In some aspects, the cooling medium 206 may be a gas such as, for example, ambient or refrigerated air. Using a gas as the cooling medium 206 may reduce the costs associated with cooling the cyclone 282. When oxygen or another common atmospheric gas is used, it may not be necessary to ensure that the gas does not escape to an exterior of the enclosure 290 when the gas is being used to cool the cyclone 282. For example, if ambient air (or ambient air that has been cooled) is used, even if a small portion of the air escapes to an exterior of the enclosure 290, the air would not pose any safety or operational risks. As such, it may not be necessary to ensure that the enclosure 290 provides a fluid-tight seal, thereby reducing manufacturing and maintenance costs. In contrast, when the cooling medium 206 is a liquid, it may be necessary to ensure that the enclosure 290 provides a fluid-tight seal in order to prevent leakage of the liquid onto the factory floor and/or surrounding machinery. Further, when ambient air (or ambient air that has been cooled) is used as the cooling medium 206, the air may be easily disposed of after it has been used.

For example, the air may be passed through a filter and released back into the surrounding environment. In contrast, when the cooling medium 206 is a liquid, it may be necessary to connect the system to a drainage source to dispose of the used liquid. But a drainage source may not be available at certain work sites, and where a drainage source is not available, it may be necessary to store the liquid in large receptacles and/or keep the liquid in a closed loop whereby it is recycled back through the powder recovery system 274. In such instances, it may become necessary to use a cooling unit to cool the liquid in between one or more uses; however, such cooling systems may be costly and require a large amount of space. Moreover, it may be preferable to use a gas as the cooling medium 206 such that a large volume of gas may be easily passed through the enclosure 290, further increasing the cooling effects of the overall system.

Furthermore, systems and methods disclosed herein may be designed to provide a limited amount of cooling to powder entrained air. For example, in certain applications, it may be desirable to only cool the powder entrained air by approximately 10° F.

The many features and advantages of the disclosure are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention. The various features and processes described above may be used independently of one another, or may be combined in various ways. All possible combinations and sub-combinations are intended to fall within the scope of this disclosure.

What is claimed is:

1. A cooled cyclone for a powder recovery system, the cooled cyclone comprising:
a body configured to receive powder entrained air from a spray booth, said body comprising an exterior surface and an interior surface of said body defining a volume for separating the powder from the air, said body further comprising a cyclone upper portion and a conical cyclone lower portion;
an enclosure that is separate from the body and that encloses the cyclone upper portion in a fluid-tight manner without enclosing the cyclone lower portion, said enclosure delimiting an enclosed and fluid-tight volume between an interior surface of said enclosure and said exterior surface of said body, the enclosure further comprising a cooling medium inlet and a cooling medium outlet; and
a pump in fluid communication with the cooling medium inlet and configured to move a cooling medium through said volume,
wherein said enclosure is configured to retain the cooling medium in thermal exchange with said exterior surface of said body.

2. The cooled cyclone of claim 1, wherein said cooling medium comprises a liquid.

3. The cooled cyclone of claim 1, wherein said cyclone upper portion is a first portion and said cyclone lower portion is a second portion,
wherein the first portion and the second portion are configured to align with each other along a first axis, and wherein said second portion is pivotally attached to said first portion by a joint.

4. The cooled cyclone of claim 3, wherein said second portion is configured to pivot about said joint between a first position and a second position, and
wherein said second portion is configured to align with said first portion along said first axis when said second portion is in said first position.

5. The cooled cyclone of claim 4, wherein said second portion comprises a powder outlet end that is releasably connectable to a powder receptacle.

6. The cooled cyclone of claim 5, wherein said powder receptacle is moveable away from said cooled cyclone when said second portion is released from said powder receptacle.

7. The cooled cyclone of claim 1, wherein said cooling medium comprises a gas.

8. The cooled cyclone of claim 7, wherein said gas is ambient air.

9. The cooled cyclone of claim 1, further comprising a cooler configured to reduce a temperature of the cooling medium.

10. The cooled cyclone of claim 1, wherein the enclosure does not contact the body.

11. The cooled cyclone of claim 1, wherein the enclosure comprises a plurality of panels that enclose the cyclone upper portion in a fluid-tight manner.

12. The cooled cyclone of claim 1, wherein the cyclone lower portion is moveable with respect to the cyclone upper portion.

13. The cooled cyclone of claim 1, wherein the enclosure is insulated to increase heat exchange efficiency.

14. A system, comprising:
a plurality of cooled cyclones according to claim 1; and
a single inlet through which said powder entrained air is received into each of said cooled cyclones.

15. The cooled cyclone of claim 1, wherein the cyclone upper portion is cylindrical.

16. A cooled cyclone for a powder recovery system, the cooled cyclone comprising:
a body configured to receive powder entrained air, said body comprising an exterior surface and an interior surface of said body defining a volume for separating the powder from the air, said body further comprising a cyclone upper portion and a conical cyclone lower portion, the cyclone lower portion being releasable and separable from the cyclone upper portion so as to be moveable away from the cyclone upper portion; and
an enclosure comprising a plurality of panels that enclose the cyclone upper portion in a fluid-tight manner, said panels delimiting an enclosed and fluid-tight volume between an interior surface of said enclosure and said exterior surface of said body such that said enclosure does not contact said body, the enclosure further comprising a cooling medium inlet and a cooling medium outlet,
wherein said enclosure is configured to retain a cooling medium in thermal exchange with said exterior surface of said body.

17. The cooled cyclone of claim 16, wherein said cooling medium comprises a liquid.

18. The cooled cyclone of claim 16, wherein said cooling medium comprises a gas.

19. The cooled cyclone of claim 18, wherein said gas is ambient air.

20. The cooled cyclone of claim 16, further comprising a cooler configured to reduce a temperature of the cooling medium.

21. A system, comprising:
a plurality of cooled cyclones according to claim 16; and
a single inlet through which said powder entrained air is received into each of said cooled cyclones.

22. The cooled cyclone of claim 16, wherein the cyclone upper portion is cylindrical.

23. A cooled cyclone for a powder recovery system, the cooled cyclone comprising:
a body configured to receive powder entrained air, said body comprising an exterior surface and an interior surface of said body defining a volume for separating the powder from the air, said body further comprising a cyclone upper portion and a conical cyclone lower portion, the cyclone lower portion being moveable with respect to the cyclone upper portion; and
an enclosure comprising a plurality of panels that enclose the cyclone upper portion in a fluid-tight manner, wherein the enclosure does not enclose the cyclone lower portion, said panels delimiting an enclosed and fluid-tight volume between an interior surface of said enclosure and said exterior surface of said body such that said enclosure does not contact said body, the enclosure further comprising a cooling medium inlet and a cooling medium outlet,
wherein said enclosure is configured to retain a cooling medium in thermal exchange with said exterior surface of said body.

* * * * *